United States Patent
Johnson et al.

(10) Patent No.: US 6,895,154 B2
(45) Date of Patent: May 17, 2005

(54) PHOTONIC CRYSTAL OPTICAL WAVEGUIDES HAVING TAILORED DISPERSION PROFILES

(75) Inventors: Steven G. Johnson, Cambridge, MA (US); Mihai Ibanescu, Cambridge, MA (US); Ori Weisberg, Cambridge, MA (US); Yoel Fink, Cambridge, MA (US); John D. Joannopolous, Belmont, MA (US); Maksim Skorobogatiy, Brighton, MA (US); Torkel Engeness, Somerville, MA (US); Marin Soljacic, Somerville, MA (US); Steven A. Jacobs, Needham, MA (US)

(73) Assignee: OmniGuide Communications, Cambridge, MA (US)

( * ) Notice: Subject to any disclaimer, the term of this patent is extended or adjusted under 35 U.S.C. 154(b) by 433 days.

(21) Appl. No.: 10/057,440

(22) Filed: Jan. 25, 2002

(65) Prior Publication Data

US 2002/0176676 A1 Nov. 28, 2002

Related U.S. Application Data

(60) Provisional application No. 60/264,201, filed on Jan. 25, 2001, provisional application No. 60/264,775, filed on Jan. 29, 2001, provisional application No. 60/265,051, filed on Jan. 30, 2001, provisional application No. 60/268,793, filed on Feb. 14, 2001, and provisional application No. 60/337,603, filed on Nov. 8, 2001.

(51) Int. Cl.[7] ............................................... G02B 6/02
(52) U.S. Cl. ...................... 385/125; 385/123; 385/124; 385/127
(58) Field of Search ........................ 385/123–127, 385/27, 28, 115, 121

(56) References Cited

U.S. PATENT DOCUMENTS 4,852,968 A   8/1989  Reed 5,185,827 A   2/1993  Poole
5,261,016 A   11/1993 Poole (Continued)

FOREIGN PATENT DOCUMENTS

| EP | 0 060 085 | 9/1982 |
|---|---|---|
| EP | 0 195 630 | 9/1986 |
| EP | 0 426 203 | 5/1991 |
| GB | 2288469 | 10/1995 |
| JP | 2000-035521 | 2/2000 |
| JP | 2001-051244 | 2/2001 |
| WO | WO 94/09393 | 4/1994 |

(Continued)

OTHER PUBLICATIONS

A. G. Bulushev et al. "Spectrally selective mode conversion at in homogeneities of optical fibers," Sov. Tech. Phys. Lett., 14, 506–507 (1988).

(Continued)

Primary Examiner—K. Cyrus Kianni
(74) Attorney, Agent, or Firm—Fish & Richardson P.C.

(57) ABSTRACT

An optical waveguide having a working mode with a tailored dispersion profile, the waveguide including: (i) a dielectric confinement region surrounding a waveguide axis, the confinement region comprising a photonic crystal having at least one photonic bandgap, wherein during operation the confinement region guides EM radiation in a first range of frequencies to propagate along the waveguide axis; (ii) a dielectric core region extending along the waveguide axis and surrounded by the confinement region about the waveguide axis, wherein the core supports at least one guided mode in the first frequency range; and (iii) a dielectric dispersion tailoring region surrounded by the confinement region about the waveguide axis, wherein the dispersion tailoring region introduces one or more additional modes in the first range of frequencies that interact with the guided mode to produce the working mode.

95 Claims, 21 Drawing Sheets

U.S. PATENT DOCUMENTS

| | | | |
|---|---|---|---|
| 5,448,674 A | | 9/1995 | Vengsarkar et al. |
| 5,641,956 A | | 6/1997 | Vengsarkar et al. |
| 5,661,839 A | | 8/1997 | Whitehead |
| 5,802,236 A | * | 9/1998 | DiGiovanni et al. ........ 385/127 |
| 5,814,367 A | | 9/1998 | Hubbard et al. |
| 5,882,774 A | | 3/1999 | Jonza et al. |
| 5,894,537 A | | 4/1999 | Berkey et al. |
| 5,995,696 A | | 11/1999 | Miyagi et al. |
| 6,043,914 A | | 3/2000 | Cook et al. |
| 6,044,191 A | | 3/2000 | Berkey et al. |
| 6,154,318 A | | 11/2000 | Austin et al. |
| 6,175,671 B1 | | 1/2001 | Roberts |
| 6,301,421 B1 | | 10/2001 | Wickham et al. |
| 6,334,017 B1 | * | 12/2001 | West .......................... 385/123 |
| 6,334,019 B1 | | 12/2001 | Birks et al. |
| 6,349,163 B1 | | 2/2002 | Antos et al. |
| 6,380,551 B2 | | 4/2002 | Abe et al. |
| 6,389,197 B1 | | 5/2002 | Iltchenko et al. |
| 6,404,966 B1 | | 6/2002 | Kawanishi et al. |
| 6,445,862 B1 | * | 9/2002 | Fajardo et al. ............... 385/125 |
| 2001/0026667 A1 | | 10/2001 | Kawanishi et al. |
| 2002/0039046 A1 | | 4/2002 | Lipson et al. |
| 2003/0077058 A1 | * | 4/2003 | Russell et al. ............... 385/125 |
| 2003/0185505 A1 | * | 10/2003 | Weisberg et al. ............. 385/28 |
| 2004/0071423 A1 | * | 4/2004 | Libori et al. ................. 385/127 |

FOREIGN PATENT DOCUMENTS

| | | |
|---|---|---|
| WO | WO 94/16345 | 7/1994 |
| WO | WO 97/01774 | 1/1997 |
| WO | WO 99/47465 | 9/1999 |
| WO | WO 99/49340 | 9/1999 |
| WO | WO 99/49341 | 9/1999 |
| WO | WO 00/22466 | 4/2000 |
| WO | WO 00/51268 | 8/2000 |
| WO | WO 00/51269 | 8/2000 |
| WO | WO 00/77549 | 12/2000 |
| WO | WO 01/69295 | 9/2001 |

OTHER PUBLICATIONS

A. N. Lazarchik, "Bragg fiber lightguides," Radiotekhnika i electronika, 1, 36–43 (1988).

Birks, et al., "Dispersion compensation using single–material fibers", IEEE Photo. Tech. Lett., 11, 1041 (1999).

C. M. de Sterke et al., "Differential losses in Bragg fibers," J. Appl. Phys., 76, 680–688 (1994).

C. Moeller, "Mode converters in the Doublet III ECH microwave system," Int. J. Electronics, 53, 587–593 (1982).

D. Marcuse et al., "Mode conversion caused by diameter changes of a round dielectric waveguide," Bell Syst. Tech. J., 48, 3217–3232 (1969).

D. Marcuse, "Theory of dielectric optical waveguides," (Academic, New York, 1974).

E. Luneville et al., "An original approach to mode converter optimum design," IEEE Trans. Microwave Theory Tech., 46, (1998).

E. Mao et al., "Wavelength–selective semiconductor in–line fibre photodetectors," Electronics Letters, vol. 36, No. 6, pp. 515–516, Mar. 16, 2000.

E. Marcatili et al., "Hollow metallic and dielectric waveguides for long distance optical transmission and lasers," Bell Syst. Tech. J., 43, 1783–1809 (1964).

E. Peral et al., "Supermodes of grating–coupled multimode waveguides and application to mode conversion between copropagating modes mediated by backward Bragg scattering," J. Lightwave Tech., 17, 942–947 (1999).

F. Brechet et al. "Analysis of bandpass filtering behavior of singlemode depressed–core–index photonic bandgap fibre," Elec. Lett., 36, 870–872 (2000).

F. Brechet et al., "Singlemode propagation into depressed–core–index photonic–bandgap fibre designed for zero–dispersion propagation at short wavelengths," Elec. Lett., 36, 514–515 (2000).

G. H. Childs, "50mm diameter $TE_{01}$ mode helical waveguide optimization," Electronics Lett., 14, 140–141 (1978).

H. F. Taylor, "Bending effects in optical fibers," J. Lightwave Tech., 2, 617–628 (1984).

H. Kumric et al., "Optimized overmoded $TE_{01}$–to–$TM_{11}$ mode converters for high–power millimeter wave applications at 70 and 140 GHz," Int. J. Infrared Millim. Waves, 7, 1439–1463 (1986).

H. Kumric et al., "Optimization of mode converters for generating the fundamental $TE_{01}$ mode from $TE_{06}$ gyrotron output at 140 GHz," Int. J. Electron., 64, 77–94 (1988).

H. Yajima, "Dielectric bypass waveguide mode order converter," IEEE J. Quantum Electronics, 15, 482–487 (1979).

I. Gannot, et al., "Current Status of Flexible Waveguides for IR Laser Radiation Transmission", IEEE J. Sel. Topics in Quantum Electr., IEEE Service Center, vol. 2, No. 4, pp. 880–888 (Dec. 1996); XP000694378.

I. K. Hwang et al., "Long–period fiber gratings based on periodic microbends," Opt. Lett., 24, 1263–1264 (1999).

I. Ogawa et al., "Design of a quasi–optical mode conversion system with variable output beam size," Int. J. Electron., 87, 457–467 (2000).

J. A. Harrington, "A review of IR transmitting, hollow waveguides", Fiber Integr. Opt. 19, 211–227 (2000).

J.C. Knight et al., "Photonic band gap guidance in optical fibers" Science 282, 1476–1478 (1998).

J. J. Refi, "Optical fibers for optical networking," Bell Labs Technical Journal, 4,246–261 (1999).

J. N. Blake et al., "Fiber–optic modal coupler using periodic microbending," Opt;. Lett., 11, 177–179 (1986).

J. S. Levine, "Rippled wall mode converters for circular waveguide," Int. J. Infrared Milim. Waves, 5, 937–952 (1984).

J.L. Auguste et al., "–1800ps/(nm–km) chromatic dispersion at 1.55μm in dual concentric core fibre", Elec. Lett., $28^{th}$ Sep. 2000, vol. 36, No. 20.

J.W. Hahn et al., "Measurement of nonreasonant third–order susceptibilities of various gases by the nonlinear interferometric technique," J. Opt. Soc. Am. B, 12, 1021–1027 (1995).

K. J. Bunch et al., "The helically wrapped circular waveguide," IEE Trans. Electron Devices, 34, 1873–1884 (1987).

K. O. Hill et al., "Efficient mode conversion in telecommunication fiber using externally written gratings," Electron. Lett., 26, 1270–1272 (1990).

L. Dong et al., "Intermodal coupling by periodic microbending in dual–core fibers—comparison of experiment and theory," J. Lightwave Tech., 12, 24–27 (1994).

L. Gruner–Nielson et al., "Dispersion compensating fibers," Optical Fiber Tech., 6, 164–180 (2000).

L. M. Field, "Some slow–wave structures for traveling–wave tubes," Proc. IRE, 37, 34–40 (1949).

Lars Grumer–Neilson et al., "New dispersion compensating fiberes for simultaneous compensation of dispersion and dispersion slope of non–zero dispersion shifted fibres in the C or L band", OFC '00.

M. Ibanescu et al., "An all–dielectric coaxial waveguide," Science, 289, 415–419 (2000).

M. J. Buckley et al., "A single period $TE_{02}$–$TE_{01}$ mode converter in a highly overmoded circular waveguide," IEEE Trans. Microwave Theory Tech., 39, 1301–1306 (1991).

M. J. Weber et al., "Measurements of the electronic and nuclear contributions to the nonlinear refractive index of beryllium fluoride glasses," Appl. Phys. Lett., 32, 403–405 (1978).

M. Miyagi, et al., "Transmission characteristics of dielectric–coated metallic waveguides for infrared transmission: slab waveguide model", IEEE J. Quantum Elec. QE–19, 136–145 (1983).

M. Miyagi, et al., "Wave propagation and attenuation in the general class of circular hollow waveguides with uniform curvature", IEEE Trans. Microwave Theory Tech. MTT–32, 513–521 (1984).

M. Otsuka et al., "Development of mode converters for 28 GHz electron cyclotron heating system," Int. J. Electron, 70, 989–1004 (1991).

M. Thumm, "High power millimeter–wave mode converters in overmoded circular waveguides using periodic wall perturbations," Int. J. Electron., 57, 1225–1246 (1984).

Mitsunobu Miyagi et al., "Design theory of dielectric–coated circular metallic waveguides for infrared transmission," J. Lightwave Tech., vol. LT–2, 116–126, Apr. 1984.

N. J. Doran et al., "Cyclindrical Bragg fibers; a design and feasibility study for optical communications," J. Lightwave Tech., 1, 588–590 (1983).

Pochi Yeh et al., "Theory of Braff fiber," J. Opt. Soc. Am., vol. 68, 1196–1201, Sep. 9, 1978.

R. F. Cregan et al., "Single–mode photonic band gap guidance of light in air," Science, 285, 1537–1539 (1999).

R.A. Abram et al., "Mode conversion in an imperfect waveguide," J. Phys. A, 6, 1693–1708 (1973).

S. Ahn et al., "Analysis of helical waveguide," IEEE Trans. Electron Devices, 33, 1348–1355 (1986).

S. H. Yun et al., "All–fiber tunable filter and laser based on two–mode fiber," Opt. Lett., 21, 27–29 (1996).

S.P. Morgan, "Theory of curved circular waveguide containing an inhomogeneous dielectric," Bell Syst. Tech. J., 36, 1209–1251 (1957).

T. Cardinal et al., "Nonlinear optical properties of chalcogenide glasses in the system As–S–Se," J. Non–Cryst. Solids, 256, 353–360 (1999).

T. Iyama et al., Propagation characteristics of dielectric–coated coaxial helical waveguide in a lossy medium, IEEE Trans. Microwave Theory Tech., 45, 557–559 (1997).

T. Kawanishi et al., "Coaxial periodic optical waveguide," Optics Express, 7, 10–22 (2000).

T. Liang et al., "Mode conversion of ultrafast pulses by grating structures in layered dielectric waveguides," J. Lightwave Tech., 15, 1966–1973 (1997).

T. M. Monro et al., "Holey Optical Fibers: An efficient modal model," IEEE J. Lightwave Technol., 17, 1093–1102 (1999).

T. ul Hag et al., "Optimized irregular structures for spatial– and temporal–field transformation," IEEE Trans. Microwave Theory Tech., 46, 1856–1867 (1998).

W. Lawson et al., "The design of serpentine–mode converters for high–power microwave applications," IEEE Trans. Microwave Theory Tech., 48, 809–814 (May 2000).

Y. Fink et al., "A dielectric omnidirectional reflector," Science, 282, 1679–1682 (1998).

Y. Fink et al., "Guiding optical light in air using an all–dielectric structure," J. Lightwave Tech., 17, 2039–2041 (1999).

Y. W. Li et al., "Triple–clad single–mode fibers for dispersion shifting," IEEE J. Lightwave Technol., 11, 1812–1819 (1993).

Y. Xu et al., "Asymptotic analysis of Bragg fibers and dielectric coaxial fibers," In Proc. SPIE, A. Dutta, A. A. S. Awwal, N. K. Duttta, and K. Okamoto, eds., 4532, 191–205 (2001).

Yong Xu et al., "Asymptotic analysis of Bragg fibers," Optics Lett., vol. 25, No. 24, pp. 1756–1758 Dec. 15, 2000.

* cited by examiner

PHOTONIC CRYSTAL OPTICAL WAVEGUIDES HAVING TAILORED DISPERSION PROFILES

CROSS-REFERENCE TO RELATED APPLICATIONS

This application claims priority to U.S. provisional patent applications 60/264,201 filed Jan. 25, 2001, 60/264,775 filed Jan. 29, 2001, 60/265,051 filed Jan. 30, 2001, 60/268,793 filed Feb. 14, 2001, and 60/337,603 filed Nov. 8, 2001, the contents of which are incorporated herein by reference.

BACKGROUND

This invention relates to the field of optical waveguides and dispersion tailoring in such waveguides.

Optical waveguides guide optical signals to propagate along a preferred path or paths. Accordingly, they can be used to carry optical signal information between different locations and thus they form the basis of optical telecommunication networks. The most prevalent type of optical waveguide is an optical fiber based on index guiding. Such fibers include a core region extending along a waveguide axis and a cladding region surrounding the core about the waveguide axis and having a refractive index less than that of the core region. Because of the index-contrast, optical rays propagating substantially along the waveguide axis in the higher-index core can undergo total internal reflection (TIR) from the core-cladding interface. As a result, the optical fiber guides one or more modes of electromagnetic (EM) radiation to propagate in the core along the waveguide axis. The number of such guided modes increases with core diameter. Notably, the index-guiding mechanism precludes the presence of any cladding modes lying below the lowest-frequency guided mode. Almost all index-guided optical fibers in use commercially are silica-based in which one or both of the core and cladding are doped with impurities to produce the index contrast and generate the core-cladding interface. For example, commonly used silica optical fibers have indices of about 1.45 and index contrasts of up to about 2–3% for wavelengths in the range of 1.5 microns.

One problem with directing optical signals along an optical waveguide is the presence of chromatic or group-velocity dispersion in that waveguide. Such dispersion is a measure of the degree to which different frequencies of the guided radiation propagate at different speeds (i.e., group velocities) along the waveguide axis. Because any optical pulse includes a range of frequencies, dispersion causes an optical pulse to spread in time as its different frequency components travel at different speeds. With such spreading, neighboring pulses or "bits" in an optical signal may begin to overlap and thereby degrade signal detection. Thus, absent compensation, dispersion over an optical transmission length places an upper limit on the bit-rate or bandwidth of an optical signal.

Chromatic dispersion includes two contributions: material dispersion and waveguide dispersion. Material dispersion comes from the frequency-dependence of the refractive index of the material constituents of the optical waveguide. Waveguide dispersion comes from frequency-dependent changes in the spatial distribution of a guided mode. As the spatial distribution of a guided modes changes, it sample different regions of the waveguide, and therefore "sees" a change in the average index of the waveguide that effectively changes its group velocity. In conventional silica optical fibers, material dispersion and waveguide dispersion cancel each other out at approximately 1310 nm producing a point of zero dispersion. Silica optical fibers have also been modified to move the zero dispersion point to around 1550 nm, which corresponds to a minimum in material absorption for silica.

Unfortunately, while operating at zero dispersion minimizes pulse spreading, it also enhances nonlinear interactions in the optical fiber such four wave mixing (FWM) because different frequencies remain phase-matched over large distances. This is particularly problematic in wavelength-division multiplexing (WDM) systems where multiple signals are carried at different wavelengths in a common optical fiber. In such WDM systems, cross-phase modulation introduces cross talk between the different wavelength channels. To address this problem, WDM systems transmit signals through optical fibers that introduce a sufficient dispersion to minimize FWM, and thereafter transmits the signals through a "dispersion compensating fiber" (DCF), to cancel the original dispersion and minimize pulse spreading in the compensated signal. Important criteria for the dispersion compensating fiber is that it provides a large enough dispersion to compensate for the aggregate dispersion of the transmission fiber, that it compensates for the dispersion at each of the WDM channels, and that it does not introduce too much loss or nonlinear effects. Accordingly, one useful measure of a DCF is the figure of merit (FOM), which is the ratio of the dispersion provided by the DCF, e.g., in units of ps/(nm–km), to the losses introduced by the DCF, e.g., in units of dB/km.

In optical fiber transmission systems, losses in the transmission fiber and the DCF are typically compensated by periodic optical amplification and/or detection and subsequent regeneration of the optical signal. In practice, however, even with DCFs that have a large FOM, there is a limit to the length of optical fiber between such dispersion compensation, amplification, and/or regeneration, because the presence of dispersion may enhance other nonlinear effects such as self phase modulation (SPM) that complicate dispersion compensation.

SUMMARY

The invention features optical waveguides having tailored dispersion profiles. For example, the waveguides may support a guided mode for use in long-distance transmission that imparts a small or even zero dispersion at one or more selected wavelengths. Furthermore, for example, the waveguide may support a guided mode for use in dispersion compensation that imparts a very large value of dispersion at one or more selected wavelengths. Notably, the optical waveguides are based on a photonic crystal confinement mechanism, rather than an index-guiding confinement mechanism. As a result, the waveguides may have a low-index core such as air, thereby minimizing nonlinear processes in the core and permitting optical transmission at zero or near-zero dispersion. Moreover, such waveguides may include constituents with large index contrasts, which facilitate design of dispersion compensating waveguides having large dispersion and/or designable profiles.

We will now summarize different aspects, features, and advantages of the invention.

In general, in one aspect, the invention features an optical waveguide having a working mode with a tailored dispersion profile. The waveguide includes: (i) a dielectric confinement region surrounding a waveguide axis, the confinement region including a photonic crystal having at least one photonic bandgap, wherein during operation the confinement region guides EM radiation in a first range of frequencies to propagate along the waveguide axis; (ii) a dielectric core region extending along the waveguide axis and surrounded by the confinement region about the waveguide axis, wherein the core supports at least one guided mode in the first frequency range; and (iii) a dielectric dispersion tailoring region surrounded by the confinement region about the waveguide axis, wherein the dispersion tailoring region introduces one or more additional modes in the first range of frequencies that interact with the guided mode to produce the working mode.

In general, in another aspect, the invention features an optical waveguide having a working mode with a tailored dispersion profile. The waveguide includes: (i) a dielectric confinement region surrounding a waveguide axis, wherein during operation the confinement region guides EM radiation in a first range of frequencies to propagate along the waveguide axis; (ii) a dielectric core region extending along the waveguide axis and surrounded by the confinement region about the waveguide axis, wherein the core supports at least one guided mode in the first frequency range, and wherein the core has an average refractive index smaller than that of the dielectric confinement region; and (iii) a dielectric dispersion tailoring region surrounded by the confinement region about the waveguide axis, wherein the dispersion tailoring region introduces one or more additional modes in the first range of frequencies that interact with the guided mode to produce the working mode.

In general, in another aspect, the invention features an optical waveguide including: (i) a dielectric confinement region surrounding a waveguide axis, the confinement region including a photonic crystal structure producing at least one photonic bandgap, wherein during operation the confinement region guides EM radiation in a first range of frequencies to propagate along the waveguide axis; (ii) a dielectric core region extending along the waveguide axis and surrounded by the confinement region about the waveguide axis, wherein the core supports at least one guided mode in the first frequency range; and (iii) a dielectric dispersion tailoring region surrounded by the confinement region about the waveguide axis, wherein the presence of the dispersion tailoring region causes the guided core mode to form a working mode that penetrates into the dispersion tailoring region for at lease one subset of frequencies within the first range of frequencies.

In general, in another aspect, the invention features a photonic crystal optical waveguide including: (i) a dielectric core region extending along a waveguide axis; (ii) a first set of at least three dielectric layers surrounding the core about the waveguide axis, the difference in refractive index between successive layers in the first set changing sign with each subsequent layer in the first set, and (iii) at least one additional dielectric layer positioned between the core and the first set of layers, wherein the thickness of the additional dielectric layer differs from that of each of any three consecutive layers in the first set of layers by more than 10%. For example, the first set of layers may guide EM radiation in a first range of frequencies to propagate along the waveguide axis. Furthermore, the thickness of the additional dielectric layer may differs from that of each of any three consecutive layers in the first set of layers by more than 30%, more than 150%, or even more than 500%.

In general, in another aspect, the invention features a photonic crystal optical waveguide including: (i) a dielectric core region extending along a waveguide axis; (ii) a plurality of higher index dielectric layers and a plurality of lower index dielectric layers alternating with one another to surround the core about the waveguide axis; and (iii) at least one additional dielectric layer positioned between the core and the pluralities of alternating dielectric layers, wherein the thickness of the additional dielectric layer differs from that of each of any three consecutive layers in the pluralities of alternating dielectric layers by more than b 10%. For example, the pluralities of alternating layers may guide EM radiation in a first range of frequencies to propagate along the waveguide axis. Furthermore, the thickness of the additional dielectric layer may differs from that of each of any three consecutive layers in the pluralities of alternating layers by more than 30%, more than 150%, or even more than 500%.

In general, in another aspect, the invention features an optical waveguide including: (i) a dielectric confinement region surrounding a waveguide axis, wherein during operation the confinement region guides EM radiation in a first range of frequencies to propagate along the waveguide axis; (ii) a dielectric core region extending along the waveguide axis and surrounded by the confinement region about the waveguide axis, wherein the core has an average refractive index smaller than that of the dielectric confinement region, defines a light line, and supports at least one guided mode in the first frequency range; and (iii) a dielectric dispersion tailoring region surrounded by the confinement region about the waveguide axis, wherein the presence of the dispersion tailoring region introduces causes the guided mode to form a working mode that crosses over the light line.

In general, in another aspect, the invention features an optical waveguide including: (i) a dielectric confinement region surrounding a waveguide axis, wherein during operation the confinement region guides EM radiation in a first range of frequencies to propagate along the waveguide axis; (ii) a dielectric core region extending along the waveguide axis and surrounded by the confinement region about the waveguide axis, wherein the core supports at least one guided mode in the first frequency range; and (iii) a dielectric dispersion tailoring region surrounded by the confinement region about the waveguide axis, wherein the presence of the dispersion tailoring region causes the guided core mode to form multiple discontinuous working modes each of which penetrates into the dispersion tailoring region for a different subset of frequencies within the first range of frequencies. The dielectric confinement region may guide the radiation using TIR index guiding or by using a photonic crystal structure.

Embodiments of any of the waveguides described above may include any of the following features.

The core may have an average refractive index smaller than that of the highest index constituent of the dielectric confinement region. The average refractive index of the core may be less than 1.3, less than 1.2, or less than 1.1. The core may include a gas. The core may have a substantially uniform refractive index.

The confinement region may include at least two dielectric materials having different refractive indices. The ratio of the refractive index of the higher index dielectric material to that of the lower index dielectric material may be greater than 1.1, greater than 1.5., or greater than 2. The two dielectric materials in the confinement region form the photonic crystal. Moreover, the photonic bandgap may be an omnidirectional photonic bandgap. The photonic bandgap may be sufficient to cause EM radiation that is incident on the confinement region from the core in the first frequency range and with any polarization to have a reflectivity for a planar geometry that is greater than 95% for angles of incidence ranging from 0° to at least 80°.

The photonic crystal may be a two-dimensionally periodic photonic crystal or a one-dimensionally periodic photonic crystal.

The confinement region may include alternating layer of two dielectric materials surrounding the core about the waveguide axis. The refractive indices and thicknesses of the alternating dielectric layers may be sufficient to produce the photonic bandgap (e.g, an omnidirectional photonic bandgap). The refractive indices and thicknesses of at least some of the alternating dielectric layers substantially satisfy the following equality:

$$\frac{d_{hi}}{d_{lo}} = \frac{\sqrt{n_{lo}^2 - 1}}{\sqrt{n_{hi}^2 - 1}},$$

where $d_{hi}$ and $d_{lo}$ are the thicknesses of adjacent higher-index and lower-index layers, respectively, and $n_{hi}$ and $n_{lo}$ are the refractive indices of the adjacent higher-index and lower-index layers, respectively. The confinement region may include at least 12 pairs of the alternating layers. For long distance transmission applications, the confinement region may includes a sufficient number of pairs of alternating layers to limit radiative losses of the guided mode to less than 0.1 dB/km for a frequency in the first range of frequencies. For dispersion compensation applications, the confinement region may include a sufficient number of pairs of alternating layers to limit radiative losses of the guided mode to less than 1 dB/m for a frequency in the first range of frequencies.

The first range of frequencies may correspond to wavelengths in the range of about 1.2 microns to 1.7 microns. Alternatively, the first range of frequencies may correspond to wavelengths in the range of about 0.7 microns to 0.9 microns. The ratio of the bandwidth of the first range of frequencies and a central frequency in the first range of frequencies may be at least about 10%.

The waveguide axis may be substantially straight or it may include one or more bends. The core may have a circular cross-section, a hexagonal cross-section, or a rectangular cross-section.

The variation in the effective index of the working mode may greater than 10% over the first range of frequencies, greater than 50% over the first range of frequencies, or greater than 100% over the first range of frequencies.

The dielectric tailoring region may positioned between the core and the confinement region with respect to the waveguide axis. The dispersion tailoring region may include one or more dielectric layers surrounding the core about the waveguide axis that introduce the one or more additional modes. For example, those layers may be adjacent the core, adjacent the confinement region or they may be spaced from either the core or the confinement region by one or more additional layers. The one or more dielectric layers that introduce the one or more additional modes may consist of only one dielectric layer, and that one dielectric layer may have a thickness sufficient to introduce only one additional mode or it may have thickness sufficient to introduce multiple additional modes.

The dispersion tailoring region may form at least one defect in the photonic crystal to introduce the one or more additional modes into the first range of frequencies. In other words, the one or more modes introduced by the dispersion tailoring region may correspond to one or more defect states in the photonic bandgap. The interaction between the guided core mode and the one or more modes introduced by the dispersion tailoring region may cause the working mode to cross over the light line for a subset of frequencies in the first range of frequencies.

The confinement region and the dispersion tailoring region may include alternating layers of two dielectric materials having different refractive indices surrounding the core about the waveguide axis. The ratio of the refractive index of the higher index dielectric layer to that of the lower index dielectric layer may be greater than 1.1, greater than 1.5, or greater than 2. The thickness of one or more of the layers in the dispersion tailoring region may differ from that of a corresponding layer in the confinement region. For example, at least one layer in the dispersion tailoring region may have a thickness that introduces a defect in the photonic crystal to support the one or more additional modes in the first range of frequencies.

The tailored dispersion profile may include a frequency point of zero dispersion in the first range of frequencies, which may be useful for long distance transmission. For example, the guided mode may be a TE mode.

The dispersion tailoring region may introduce multiple additional modes into the first range of frequency, and wherein the guided mode interacts with the multiple additional modes to produce multiple discontinuous working modes each having a tailored dispersion profile. For example, each of the working modes may have a point of zero dispersion at a different frequency in the first range of frequency.

The tailored dispersion profile may be used for dispersion compensation and may include a first frequency point in the first range of frequencies having a dispersion D with an absolute value greater than 200 ps/(nm–km), greater than 1,000 ps/(nm–km), or greater than 10,000 ps/(nm–km). The sign of D may be negative or positive. The relative dispersion slope at the first frequency point has an absolute value greater than about 0.02 nm$^{-1}$, or even greater than about 0.1 nm$^{-1}$. The tailored dispersion profile may have a figure of merit at the first frequency point greater than about 200 ps/(nm–dB), or even greater than about 500 ps/(nm–dB). The guided mode may be any of a TE mode, an EH$_{11}$ mode, and an HE$_{11}$ mode.

The confinement region, core, and dispersion tailoring region may include at least two axial segments having different cross-sectional refractive index profiles. For example, the cross-sectional profile of the two segments may be substantially identical but for a scaling factor (which may be greater than about 1%, 2%, or 5%).

At least a first end of the waveguide may include a coupling segment over which the refractive index cross-section is continuously varied to alter the field profile of the working mode. Furthermore, there may be a second waveguide coupled to the first mentioned waveguide, wherein the cross-section of the second waveguide adjacent the first waveguide includes regions of doped silicon located to improve coupling of the working mode into the second waveguide. Alternatively, or in addition, the cross-section of the second waveguide adjacent the first waveguide may include a hollow ring contacting the dispersion tailoring region of the first waveguide to thereby improve coupling of the working mode into the second waveguide.

In a further aspect, the invention includes an optical telecommunications system including: a transmission waveguide for carrying at least a first optical signal; and a dispersion compensating waveguide including any of the optical waveguides described above, wherein the dispersion compensating waveguide is coupled to the transmission waveguide and has a tailored dispersion profile selected to compensate for dispersion imparted to the first optical signal by the transmission waveguide. In some embodiments of the system, the transmission waveguide may carry multiple optical signals each at corresponding frequencies, and wherein the tailored dispersion profile of the dispersion compensating waveguide is selected to compensate for dispersion imparted to each of the optical signals by the transmission waveguide. Also, in some embodiments of the system, the dispersion compensating fiber may be placed within the system where optical power is designed to reach at least 25 dBm.

In general, in another aspect, the invention features a method for compensating for dispersion in an optical signal, the method including coupling the optical signal into a photonic crystal fiber having a tailored dispersion profile. For example, the photonic crystal fiber may have any of the features described above.

In general, in another aspect, the invention features a method of designing a dispersion compensating fiber having a selected dispersion profile. The method includes: (i) introducing a dispersion tailoring region to an initial waveguide design including a dielectric confinement region surrounding a waveguide axis that guides EM radiation in a first range of frequencies to propagate along the waveguide axis, and a dielectric core region extending along the waveguide axis and surrounded by the confinement region about the waveguide axis, wherein the dielectric confinement region includes a photonic crystal structure having a photonic bandgap, and wherein the dielectric dispersion tailoring region is surrounded by the confinement region about the waveguide axis; and (ii) selecting the refractive index profile of the dispersion tailoring region to introduce one or more modes in the first range of frequencies that interact with the guided mode to produce a working mode having the selected dispersion profile. The photonic crystal dispersion compensating fiber may have any of the features described above.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Additional features, objects, and advantages of the invention will be apparent from the following detailed description and drawings, and from the claims.

DESCRIPTION OF DRAWINGS

The invention will now be further described merely by way of example with reference to the accompanying drawings in which.

DETAILED DESCRIPTION

Figure 1:
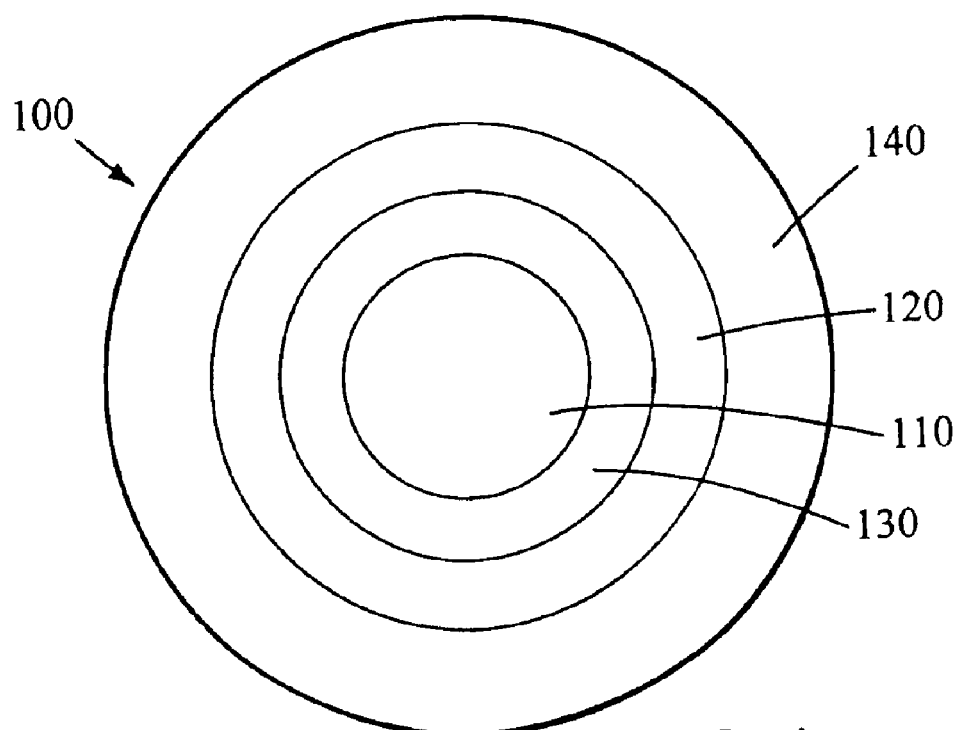
FIG. 1 is a schematic diagram of the cross-section of a waveguide 100 having a tailored dispersion profile.

The invention features a photonic crystal fiber waveguide 100 having a tailored dispersion profile. The cross-section of waveguide 100 is shown in FIG. 1 and includes a dielectric core 110 extending along a waveguide axis, a dielectric dispersion tailoring region 130, and a dielectric confinement region 120 surrounding the core and the dispersion tailoring region. Confinement region 120 includes a photonic crystal structure that guides EM radiation in a first range of frequencies to propagate along the waveguide axis. Details of the confinement mechanism are described further below. In the absence of dispersion tailoring region 130, core 110 supports at least one guided mode in the first frequency range. The presence of dispersion tailoring region 130 introduces at least one additional mode in the first frequency range that interacts with the guided mode to change its dispersion properties and produce a working mode having the tailored dispersion profile. Waveguide 100 may further include an additional cladding layer 140 surrounding the confinement region 120 to provide structural support to the waveguide as a whole. Because cladding layer 140 does not contribute substantially to the optical properties (e.g., radiative losses and dispersion) of the waveguide, we do not discuss it further.

In the description that follows, we assume, to simplify numerical calculations, a circular cross-section for fiber waveguide 100, with core 110 having a circular cross-section and regions 120 and 130 having annular cross-sections. In other embodiments, however, the waveguide and its constituent regions may have different geometric cross-section such as a rectangular or a hexagonal cross-section. Furthermore, as mentioned below, core region 110 and surrounding regions 120 and 130 may comprise multiple dielectric materials having different refractive indices. In such cases, we may refer to an "average refractive index" of a given region, which refers to the sum of the weighted indices for the constituents of the region, where each index is weighted by the fractional area in the region of its constituent. In all cases, however, the boundary between any of regions 110, 120, and 130 is defined by a change in index. The change may be caused by the boundary of two different dielectric materials or by different dopant concentrations in the same dielectric material (e.g., different dopant concentrations in silica).

Figure 2:
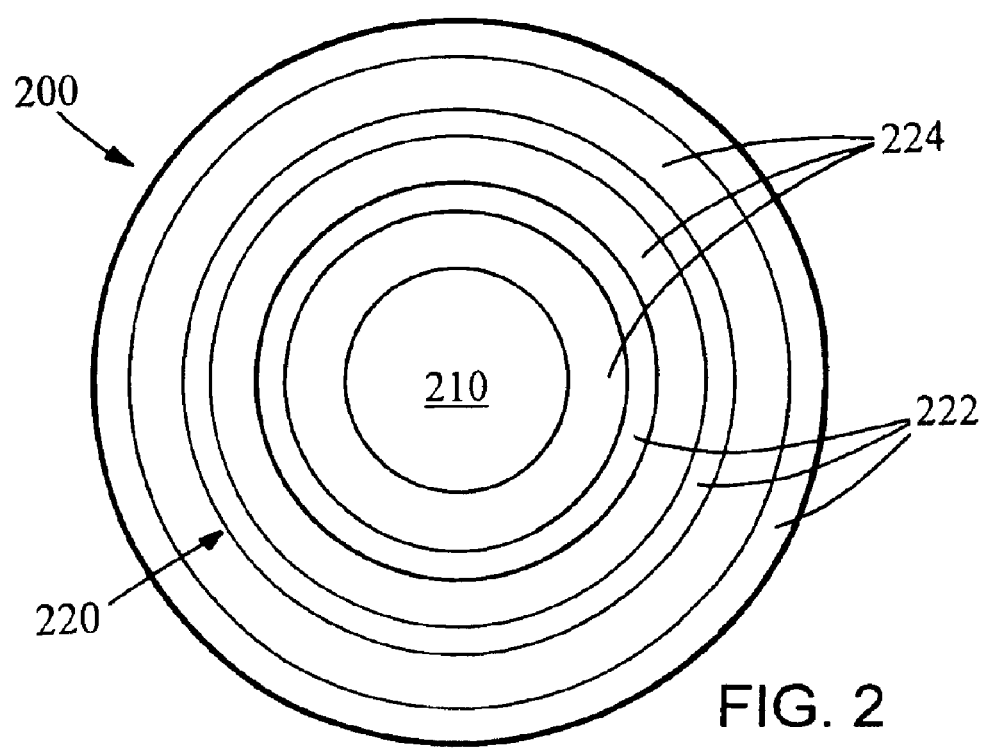
FIG. 2 is a schematic diagram of the cross-section of a Bragg fiber waveguide 200.

We begin by describing the core and confinement regions in a photonic crystal waveguide fiber in which the dielectric dispersion tailoring region is not present. Referring to FIG. 2, a cross-section of a photonic crystal fiber 200 is shown having a dielectric core region 210 extending along a waveguide axis out of the plane of the page, and a dielectric confinement region 220 surrounding core 210 and including alternating layers 222 and 224 of dielectric materials having different refractive indices. One set of layers, e.g., layers 222, define a high-index set of layers having an index $n_{hi}$ and a thickness $d_{hi}$, and the other set of layers, e.g., layers 224, define a low-index set of layers having an index $n_{lo}$ and a thickness $d_{lo}$, where $n_{hi} > n_{lo}$. For convenience only a few of the dielectric confinement layers are shown in FIG. 2. In practice, confinement region 220 may include many more layers (e.g., twenty or more layers). The structure of waveguide 200 can have many advantages as a long-distance transmission fiber and is also described in commonly owned U.S. application Ser. No. 10/057,258 entitled "Low-loss photonic crystal waveguide having large core radius," filed Jan. 25, 2001, the contents of which are incorporated herein by reference.

Dielectric confinement region 220 guides EM radiation in a first range of frequencies to propagate in dielectric core 210 along the waveguide axis. The confinement mechanism is based on a photonic crystal structure in region 220 that forms a bandgap including the first range of frequencies. Because the confinement mechanism is not index-guiding, it is not necessary for the core to have a higher index than that of the portion of the confinement region immediately adjacent the core. To the contrary, core 210 may have a lower average index than that of confinement region 220. For example, core 210 may be air or vacuum. In such a case, EM radiation guided in the core will have much smaller losses and much smaller nonlinear interactions than EM radiation guided in a silica core, reflecting the smaller absorption and nonlinear interaction constants of many gases relative to silica or other such solid material. In additional embodiments, for example, core 210 may include a porous dielectric material to provide some structural support for the surrounding confinement region while still defining a core that is largely air. Accordingly, core 210 need not have a uniform index profile.

The alternating layers 222 and 224 of confinement region 220 form what is known as a Bragg fiber. The alternating layers are analogous to the alternating layers of a planar dielectric stack reflector (which is also known as a Bragg mirror). The annular layers of confinement region 220 and the alternating planar layers of a dielectric stack reflector are both examples of a photonic crystal structure. Photonic crystal structures are described generally in *Photonic Crystals* by John D. Joannopoulos et al. (Princeton University Press, Princeton N.J., 1995).

As used herein, a photonic crystal is a dielectric structure with a refractive index modulation that produces a photonic bandgap in the photonic crystal. A photonic bandgap, as used herein, is a range of frequencies in which there are no accessible extended (i.e., propagating, non-localized) states in the dielectric structure. Typically the structure is a periodic dielectric structure, but it may also include, e.g., more complex "quasi-crystals." The bandgap can be used to confine, guide, and/or localize light by combining the photonic crystal with "defect" regions that deviate from the bandgap structure. Moreover, there are accessible extended states for frequencies both below and above the gap, allowing light to be confined even in lower-index regions (in contrast to index-guided TIR structures). The term "accessible" states means those states with which coupling is not already forbidden by some symmetry or conservation law of the system. For example, in two-dimensional systems, polarization is conserved, so only states of a similar polarization need to be excluded from the bandgap. In a waveguide with uniform cross-section (such as a typical fiber), the wavevector $\beta$ is conserved, so only states with a given $\beta$ need to excluded from the bandgap to support photonic crystal guided modes. Moreover, in a waveguide with cylindrical symmetry, the "angular momentum" index m is conserved, so only modes with the same m need to be excluded from the bandgap. In short, for high-symmetry systems the requirements for photonic bandgaps are considerably relaxed compared to "complete" bandgaps in which all states, regardless of symmetry, are excluded.

Accordingly, the dielectric stack reflector is highly reflective in the photonic bandgap because EM radiation cannot propagate through the stack. Similarly, the annular layers in confinement region 220 provide confinement because they are highly reflective for incident rays in the bandgap. Strictly speaking, a photonic crystal is only completely reflective in the bandgap when the index modulation in the photonic crystal has an infinite extent. Otherwise, incident radiation can "tunnel" through the photonic crystal via an evanescent mode that couples propagating modes on either side of the photonic crystal. In practice, however, the rate of such tunneling decreases exponentially with photonic crystal thickness (e.g., the number of alternating layers). It also decreases with the magnitude of the index contrast in the confinement region.

Furthermore, a photonic bandgap may extend over only a relatively small region of propagation vectors. For example, a dielectric stack may be highly reflective for a normally incident ray and yet only partially reflective for an obliquely incident ray. A "complete photonic bandgap" is a bandgap that extends over all possible wavevectors and all polarizations. Generally, a complete photonic bandgap is only associated with a photonic crystal having index modulations along three dimensions. However, in the context of EM radiation incident on a photonic crystal from an adjacent dielectric material, we can also define an "omnidirectional photonic bandgap," which is a photonic bandgap for all possible wavevectors and polarizations for which the adjacent dielectric material supports propagating EM modes. Equivalently, an omnidirectional photonic bandgap can be defined as a photonic band gap for all EM modes above the light line, wherein the light line defines the lowest frequency propagating mode supported by the material adjacent the photonic crystal. For example, in air the light line is approximately given by $\omega=c\beta$ where $\omega$ is the angular frequency of the radiation, $\beta$ is the wavevector, and c is the speed of light. A description of an omnidirectional planar reflector is disclosed in U.S. Pat. No. 6,130,780, the contents of which are incorporated herein by reference. Furthermore, the use of alternating dielectric layers to provide omnidirectional reflection (in a planar limit) for a cylindrical waveguide geometry is disclosed in Published PCT application WO 00/22466, the contents of which are incorporated herein by reference.

When alternating layers 222 and 224 in confinement region 220 give rise to an omnidirectional bandgap with respect to core 210, the guided modes are strongly confined because, in principle, any EM radiation incident on the confinement region from the core is completely reflected. As described above, however, such complete reflection only occurs when there are an infinite number of layers. For a finite number of layers (e.g., about 20 layers), an omnidirectional photonic bandgap may correspond to a reflectivity in a planar geometry of at least 95% for all angles of incidence ranging from 0° to 80° and for all polarizations of EM radiation having frequency in the omnidirectional bandgap. Furthermore, even when waveguide 200 has a confinement region with a bandgap that is not omnidirectional, it may still support a strongly guided mode, e.g., a mode with radiation losses of less than 0.1 dB/km for a range of frequencies in the bandgap. Generally, whether or not the bandgap is omnidirectional will depend on the size of the bandgap produced by the alternating layer (which generally scales with index contrast of the two layers) and the lowest-index constituent of the photonic crystal.

Figure 3:
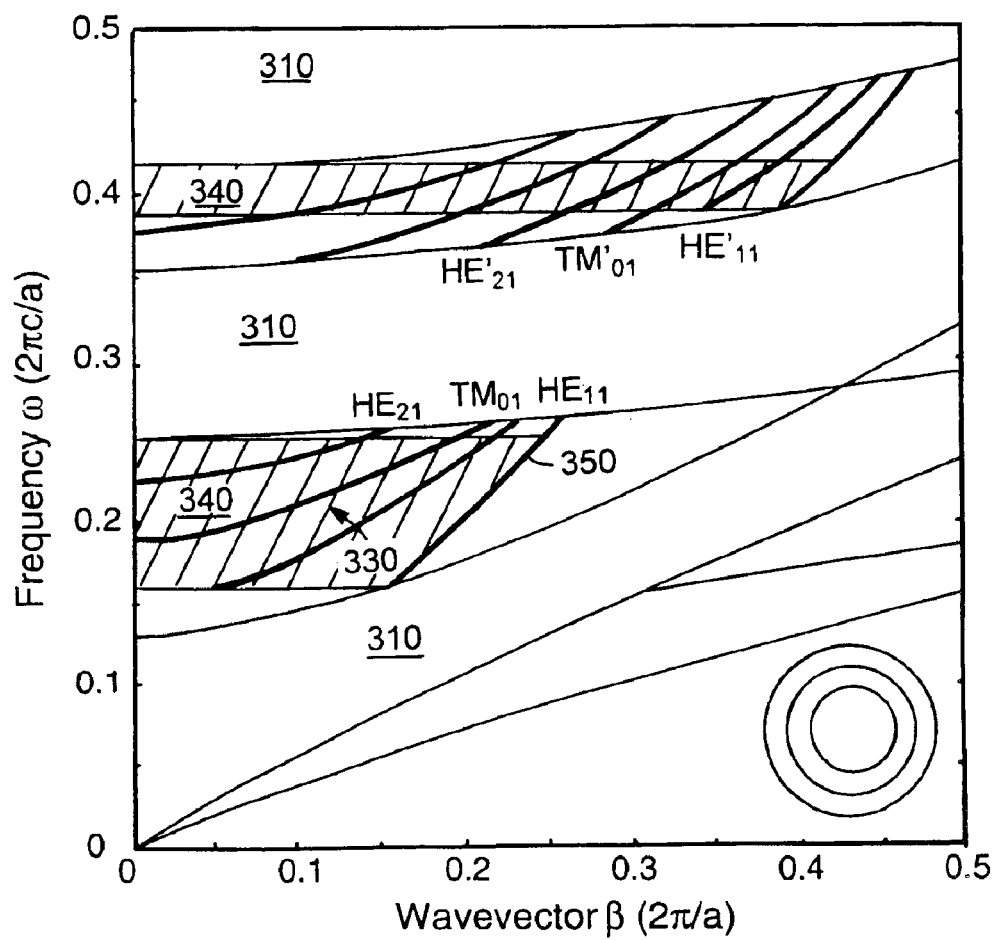
FIG. 3 is a photonic band diagram for a Bragg fiber waveguide with an omnidirectional bandgap.

FIG. 3 shows a representative diagram of a band diagram for waveguide 200, where the angular frequency $\omega$ is expressed in units of $2\pi c/a$ and the axial wavevector $\beta$ is expressed in units of $2\pi/a$, and where a is the combined thickness of a high-index layer and a low-index layer in the confinement region. The dark areas 310 correspond to the continuum of modes supported in the confinement region (where the calculation assumes a confinement region of infinite radial extent thereby giving rise to a continuum of modes). The gaps between the dark regions correspond to bandgap regions, and the lines therein correspond to guided modes 330 substantially confined to the core. Notably, FIG. 3 includes an omnidirectional bandgap region (lightly shaded region 340) because there is a subset of frequencies within the bandgap for all wavevectors above the light line 350. The number of guided modes within a particular frequency range depends on the size of the core. Notably, however, even when the core is large enough to support multiple modes, differential losses among the multiple modes typically lead to "effective" single mode operation when the waveguide is used over a long enough distance. The differential radiation losses arise because the degree to which each mode penetrates into the confinement region typically varies. In general, the lowest loss mode is the $TE_{01}$ mode, where the mode designation follows the conventions used in metallic waveguides.

The classic design of the Bragg mirror, the one that maximizes the band gap size and thus the field attenuation rate into the mirror, is the "quarter-wave stack." In such a design, the optical thickness of the high-index layers equals that of the low-index layers, which produces a mid-gap wavelength that is four times the layer thickness. The optical thickness, however, depends upon the angle of incidence. In a Bragg mirror, the thicknesses are typically chosen for normally incident light, resulting in $d_{hi}/d_{lo}=n_{lo}/n_{hi}$. For cylindrical waveguide 200, however, the desired modes typically lie along the light line, far from the $\beta=0$ point of normal incidence (where $\beta$ is the wavector along the waveguide axis), where such modes have zero group velocity. Therefore, the parameters for layers 222 and 224 are optimized for $\omega \approx c\beta$, where the index of the core is assumed to be about 1, and thus the quarter-wave condition corresponds to:

$$\frac{d_{hi}}{d_{lo}} = \frac{\sqrt{n_{lo}^2 - 1}}{\sqrt{n_{hi}^2 - 1}} \quad (1)$$

Strictly speaking, Equation (1) is not exactly optimal because the quarter-wave condition is modified by the cylindrical geometry, which may require the optical thickness of each layer to vary smoothly with its radial coordinate. Moreover, there may be additional design criteria (such as minimizing average nonlinearities over some bandwidth) besides maximizing field attenuation at mid-gap. In general, however, we find that Eq. (1) provides an excellent approximation to optimizing many desirable properties, especially for core radii many times larger than the mid-gap wavelength.

One suitable set of parameters for waveguide 200 is as follows: a hollow circular core of radius R equal to 15.35 microns, and a confinement region consisting of 25 alternating concentric layers of high-index ($n_{hi}=2.8$) and low-index ($n_{hi}=1.5$) glasses (e.g., chalcogenides) with thicknesses of 0.153 microns and 0.358 microns, respectively (i.e., $d_{hi}=0.153$ microns and $d_{lo}=0.358$ microns). The relatively large radius of the core leads to a large number of guided modes. The mode of interest for long distance propagation is typically the $TE_{01}$ mode, which is the mode that penetrates the least into the confinement region and thus has the lowest losses. All other guided modes have higher attenuation rates and are therefore negligible after a long distance of propagation. The $TE_{01}$ mode extends over roughly a 50% frequency range, bounded both above and below by band gap edges. Over the whole frequency range, it is above the light line, so that (i) it could not be guided by a TIR mechanism, and (ii) it is not evanescent in the air core. In fact, the mode frequency lies everywhere less than 0.25% above the light line, suggesting that the effects of the confinement region are small. For example, in the middle of the frequency range, at mid-gap, less than 0.01% of the optical power lies in the cladding. Moreover, the $TE_{01}$ mode is an m=0 mode that possesses azimuthal symmetry, thus it is a singlet state that is not subject to polarization mode dispersion (PMD).

Figure 4:
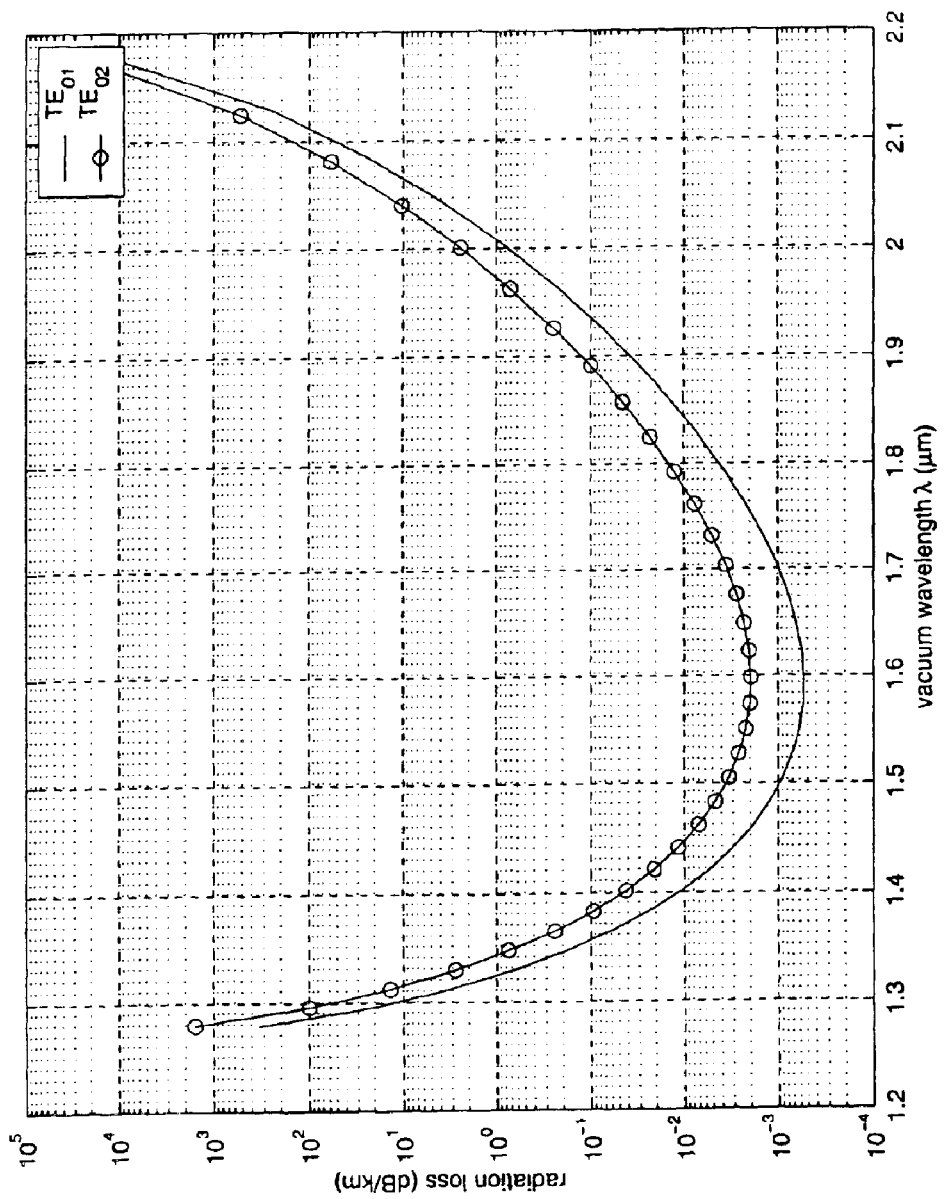
FIG. 4 is a graph of radiation losses for modes of a 25-layer Bragg fiber.

Radiation losses for the 25-layer waveguide are shown in FIG. 4 for the $TE_{01}$ lowest-loss mode is $TE_{01}$, and the next lowest loss mode, which is $TE_{02}$. Notably, the radiation loss rates are well under those of traditional silica fibers, dropping below 0.001 dB/km, even with such few layers. Furthermore, the $TE_{02}$ mode has significantly higher losses over the whole range. Accordingly, if this were the dominant loss mechanism, then the $TE_{01}$ mode would be the dominant propagated mode and modal dispersion could be avoided for sufficient propagation lengths.

Figure 5:
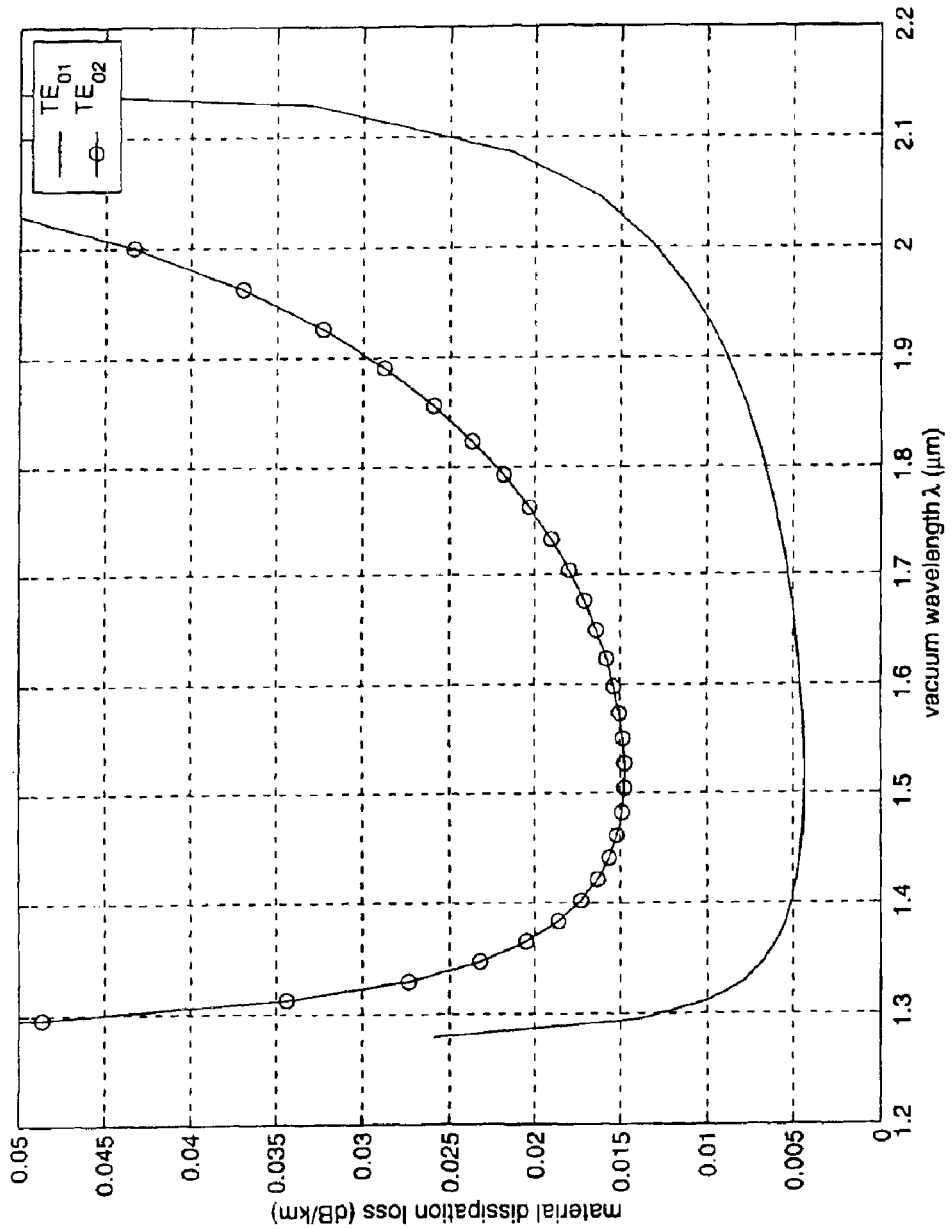
FIG. 5 is a graph of material dissipation losses for modes of the 25-layer Bragg fiber.

In addition to radiation losses, however, there are material absorption losses arising from material absorption. Because of the hollow core, the material absorption is relatively small, nonetheless, there is absorption by the confinement region of the evanescent component of the guided modes penetrating therein. Again, the lowest-loss modes are $TE_{01}$ and $TE_{02}$, and the material absorption losses are plotted in FIG. 5 where we assume a material dissipation rate of 0.1 dB/m in the confinement region, which is a typical value for high-index chalcogenide glasses. As shown in FIG. 5, even though the confinement region has a material absorption a 1000 times larger than that of silica, the effective absorption losses for the lowest loss mode in the 25-layer waveguide is smaller than that in silica, dropping below 0.005 dB/km. In addition, the next lowest-loss mode in the 25-layer waveguide has considerably higher losses (about three times larger), which again serves as a modal filter to produce effectively single-mode behavior. For similar reasons, non-linear interactions in the 25-layer waveguide are greatly reduced for the lowest-loss mode because its energy density is substantially confined to the hollow core.

Figure 6:
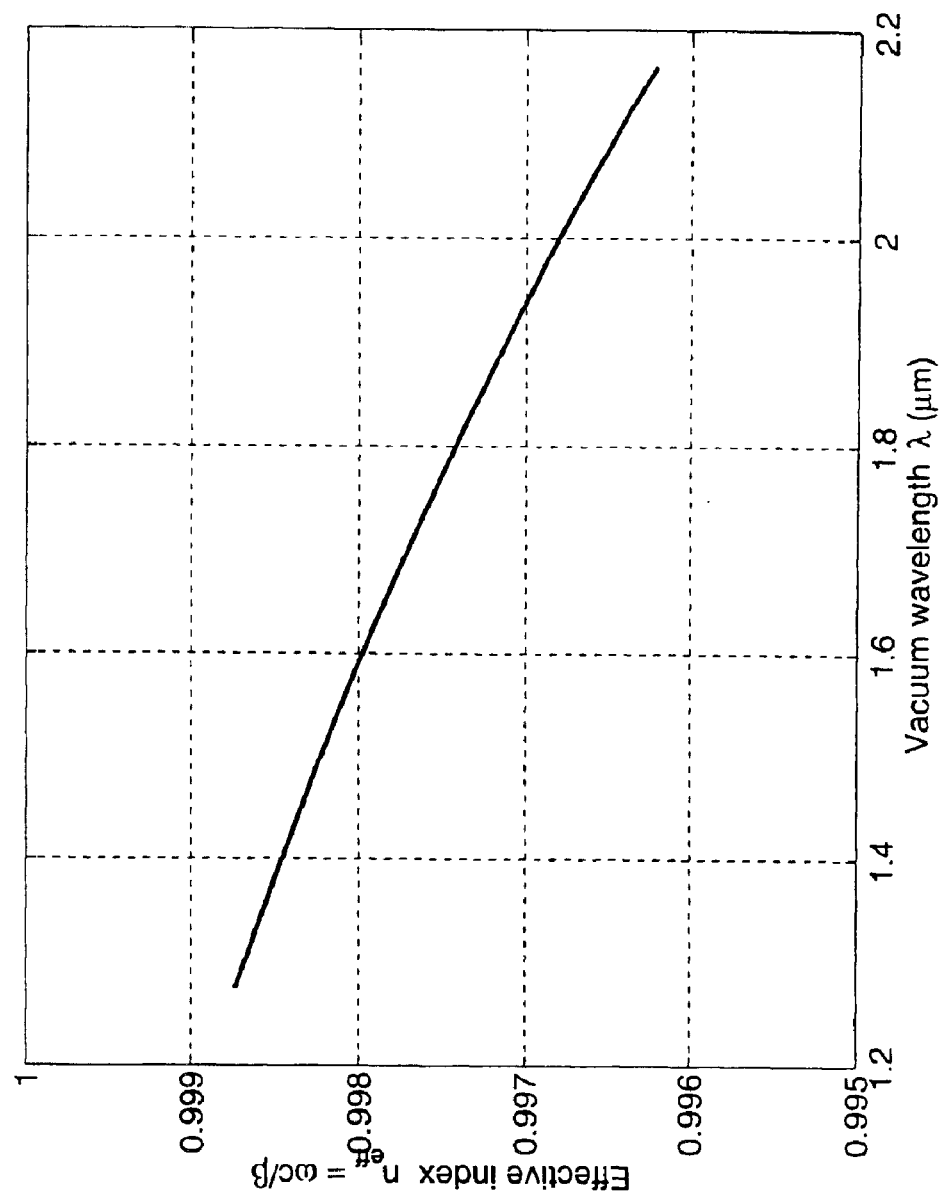
FIG. 6 is a graph of effective index for a mode of the 25-layer Bragg fiber.
Figure 7:
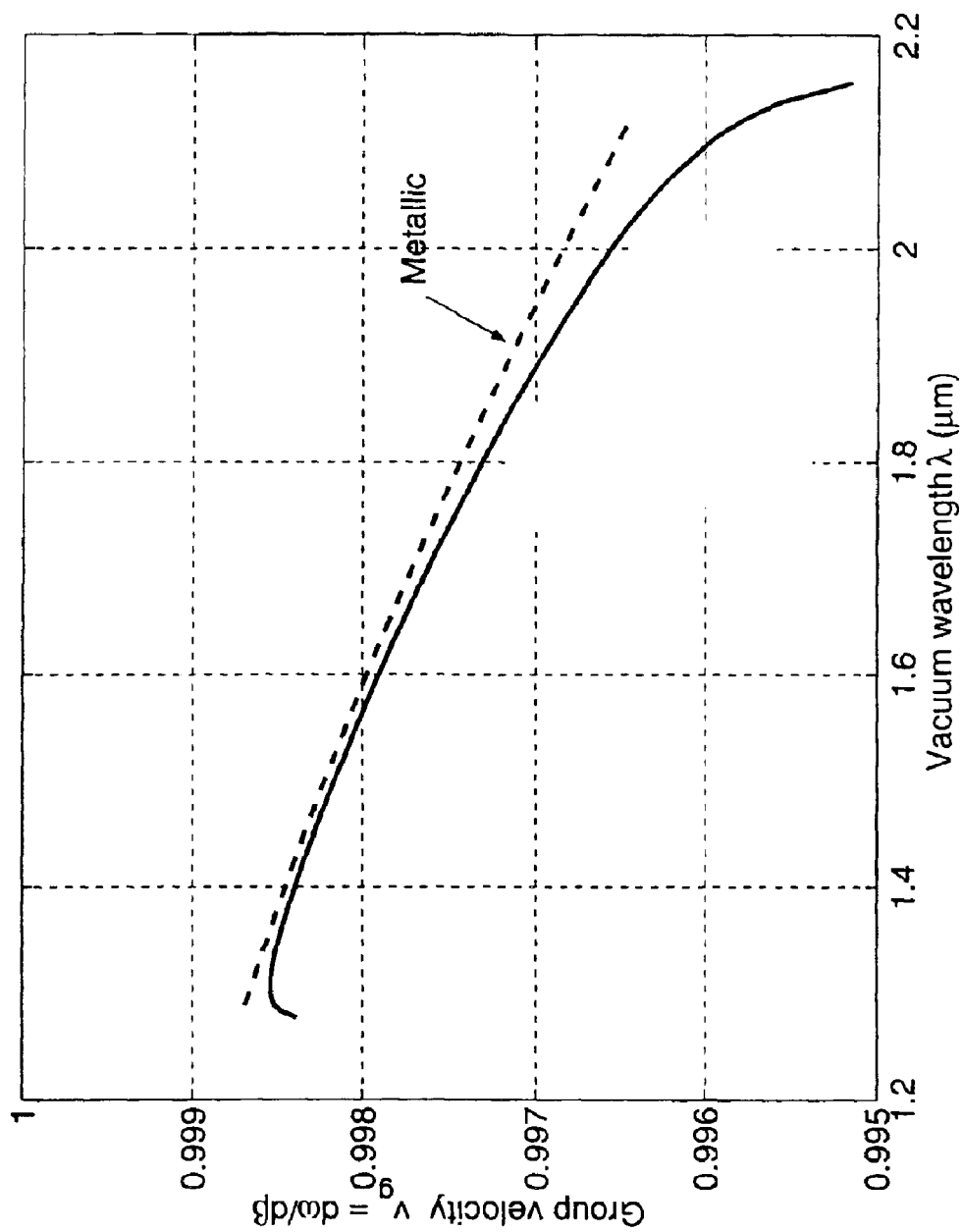
FIG. 7 is a graph of group velocity for a mode of the 25-layer Bragg fiber.

We now consider the dispersion properties of the 25-layer waveguide. FIG. 6 shows the effective index $n_{eff}=\beta c/\omega$ of the $TE_{01}$ mode and FIG. 7 shows its group velocity, $v_g=d\omega/d\beta$. Finally, FIG. 8 shows the waveguide dispersion D, which is defined as $$D = -2\pi c \left(\frac{\partial^2 \beta}{\partial \omega^2}\right)/\lambda^2.$$

Figure 8:
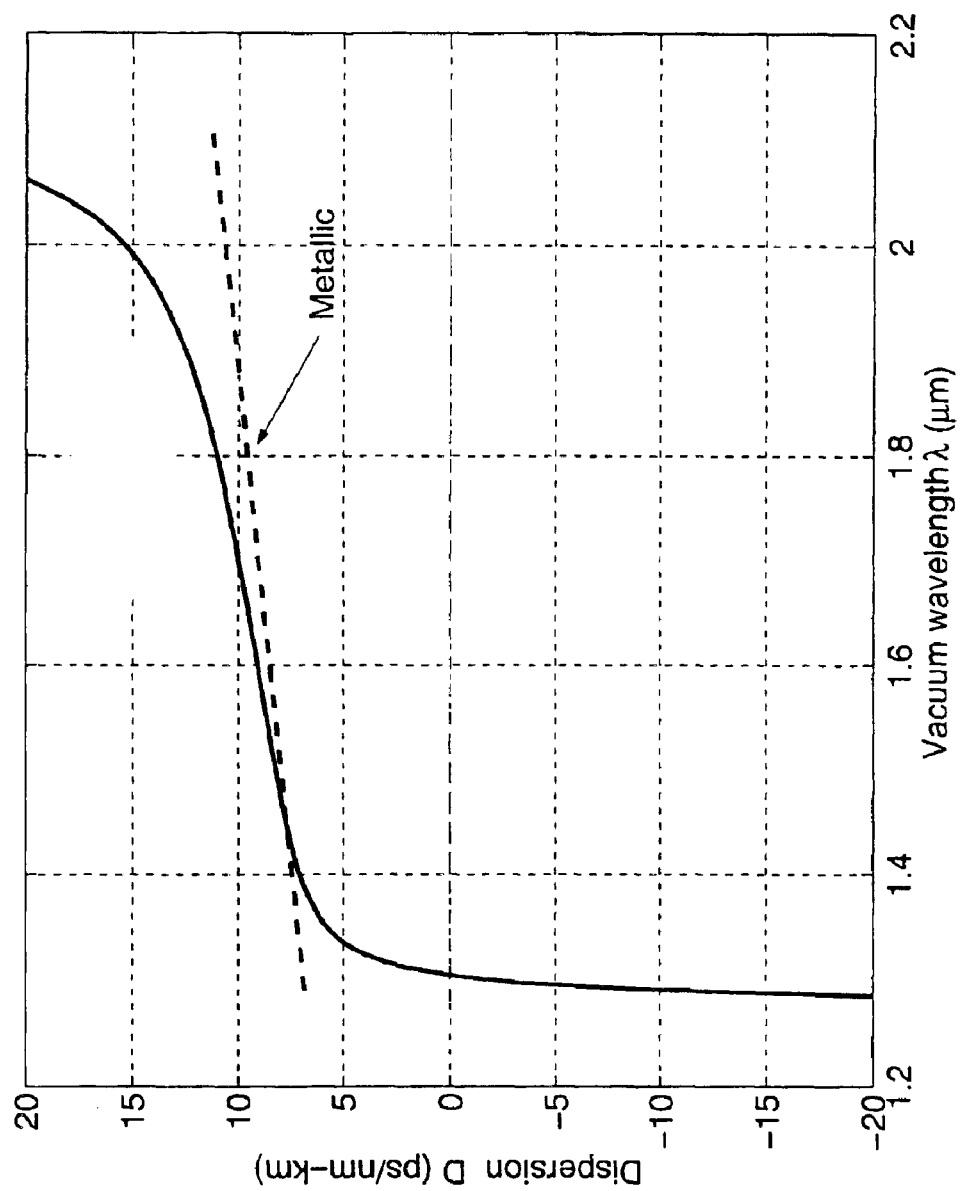
FIG. 8 is a graph of dispersion D for a mode of the 25-layer Bragg fiber.

Inside the wavelength range corresponding to the bandgap of the confinement region, the group velocity and the dispersion of the waveguide are relatively constant and similar to those of a hollow metallic waveguide having the same core radius (corresponding to the dashed curves in FIGS. 7 and 8). On the other hand, at the edges of the bandgap, the dispersion changes dramatically as electromagnetic energy begins to penetrate more deeply into the confinement regions as a function of wavelength. This increased penetration causes an increase in the average index of refraction seen by the guided radiation, which leads to a rapid decrease in the group velocity of the mode near the edges and correspondingly large changes in waveguide dispersion. As shown in FIG. 8, the 25-layer waveguide includes a point of zero-dispersion and also points of very large dispersion. Such points may be useful for signal transmission and dispersion compensation, respectively, but for the fact that they are located near the bandgap edges and are therefore very lossy. As described further below, the introduction of a dispersion tailoring region between the core and the confinement region can move such points towards the middle of the bandgap where losses are much smaller.

Before describing embodiments including the dispersion tailoring region, we note that for any of the embodiments disclosed herein, the dielectric confinement region may include photonic crystal structures different from a multi-layer Bragg configuration. For example, rather than the Bragg configuration, which is an example of a one-dimensionally periodic photonic crystal (in the planar limit), the confinement region may be selected to form, for example, a two-dimensionally periodic photonic crystal (in the planar limit), such as an index modulation corresponding to a honeycomb structure. See, for example, R. F. Cregan et al., Science 285:1537–1539, 1999.

Figure 9:
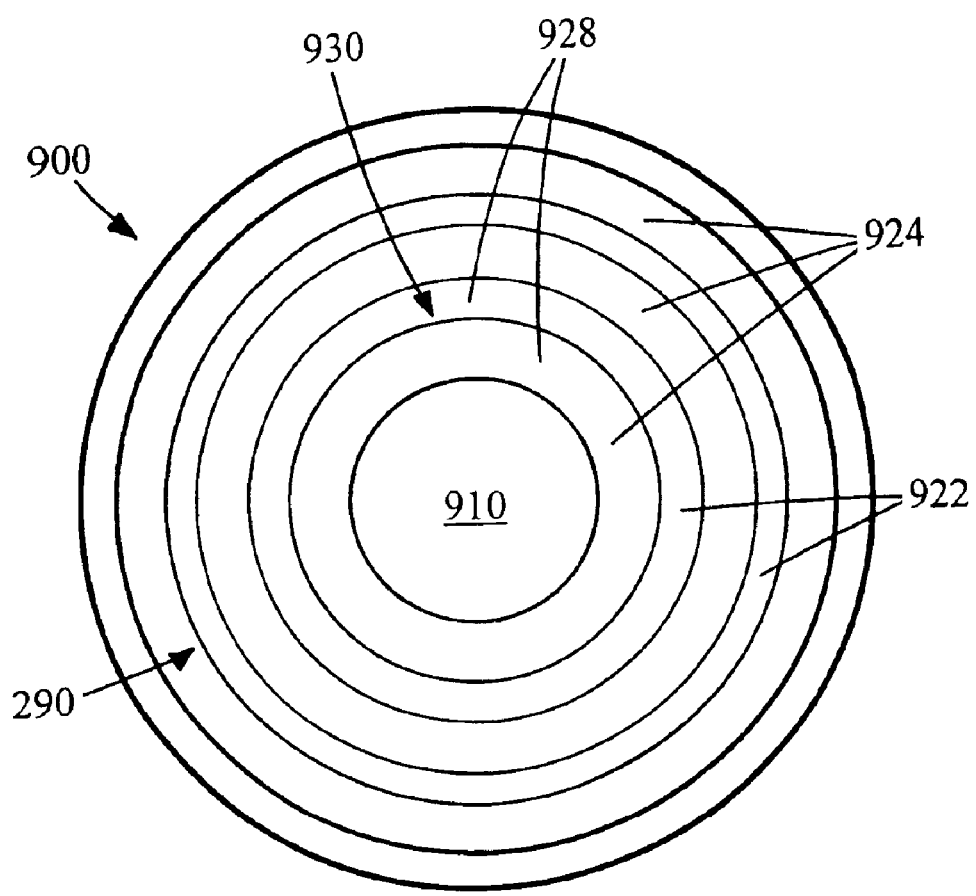
FIG. 9 is a schematic diagram of the cross-section of a Bragg fiber 900 having a dispersion tailoring region.

FIG. 9 shows a cross-section of a photonic crystal fiber 900 including a dielectric core region 910 and a dielectric confinement region 920 including alternating layers 922 and 924 of dielectric materials having different refractive indices. Fiber 900 is identical to fiber 200 except that the thickness of one or more of the first few layers 928 adjacent core 910 are altered to define a dispersion tailoring region 930. As in FIG. 2, for convenience FIG. 9 shows only the first couple layers of confinement region 920.

Figure 10:
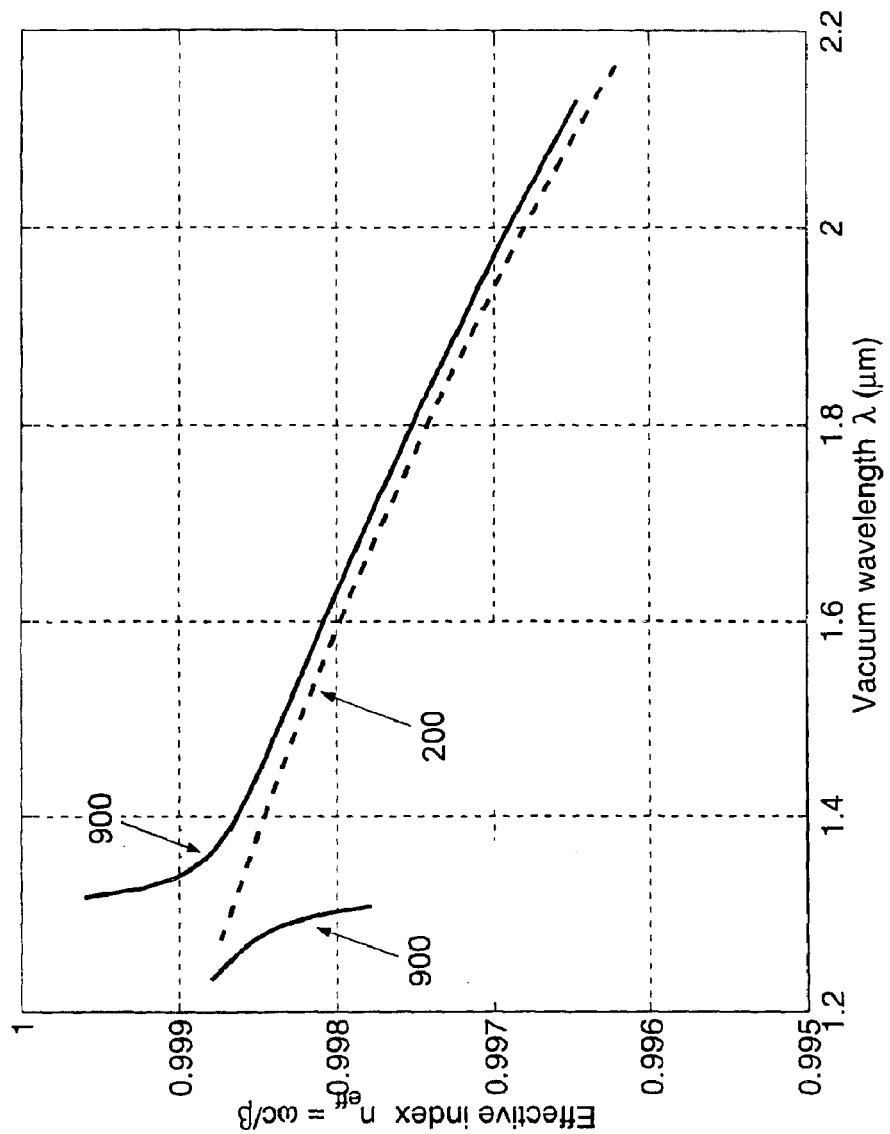
FIG. 10 is a graph of effective index for a mode of the Bragg fiber 900.
Figure 11:
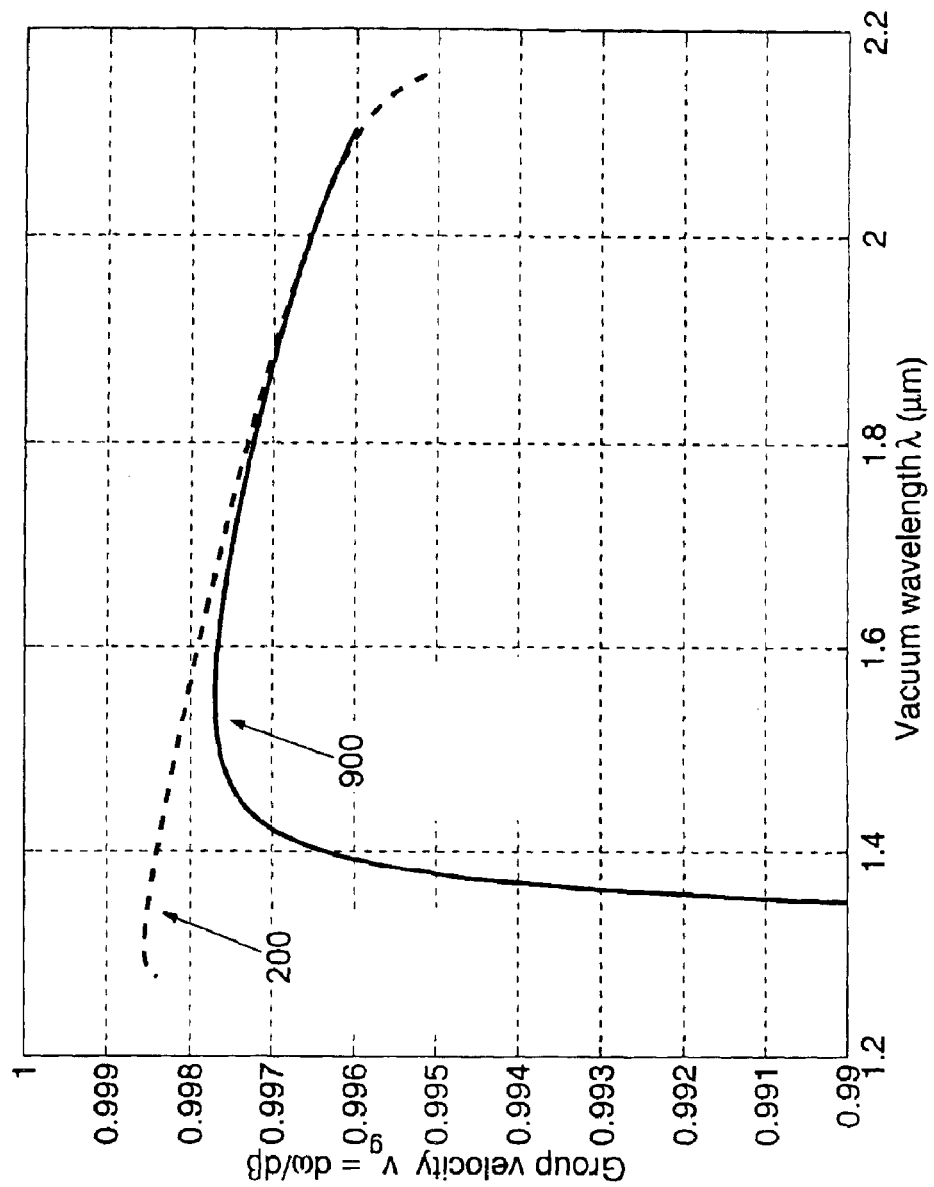
FIG. 11 is a graph of group velocity for a mode of the Bragg fiber 900.

By changing the thicknesses of these layers 928, the guided modes in the core (e.g., the $TE_{01}$ mode) penetrate more deeply into the alternating layers over a subset of the guided wavelengths. The particular range of this subset depends on the thickness variations of layers 928, which can be selected to position the subset within the bandgap. The increased penetration causes a local decrease in the group velocity of a guided mode to introduce some extra negative dispersion relative to that in waveguide 200. As a result, the dispersion of a working mode derived from the guided mode in waveguide 900 can be made to be zero near the wavelengths corresponding to increased penetration into the dispersion tailoring region. For example, if the thicknesses of the first two inner most layers are changed to 0.256 microns and 0.137 microns (from 0.358 microns and 0.153 microns, respectively), the effective index and group velocity for the resulting waveguide (solid curves) relative to the original parameters for the waveguide (dashed curves) are shown in FIGS. 10 and 11, respectively. FIG. 11 shows that the group velocity is flat as a function of wavelength at around 1.55 microns, which corresponds to a point of zero dispersion in the middle of the bandgap. Furthermore, the change in thickness can cause a mode that was confined largely in layers 928 to penetrate into the core and cause a local increase in the group velocity and introduce some extra positive dispersion relative to that in waveguide 200.

Qualitatively, the change in thicknesses of layers 928 (which corresponds, in this example, to the introduction of disperison tailoring region 930) produces a defect in the photonic crystal structure of confinement region 920 and introduces a defect mode localized in the region of the defect 928 to enter the bandgap. The defect mode interacts with at least one guided mode in the core (e.g., the $TE_{01}$ mode) to change its dispersion relation $\omega(\beta)$ and define a working mode with a tailored dispersion profile.

Figure 12:
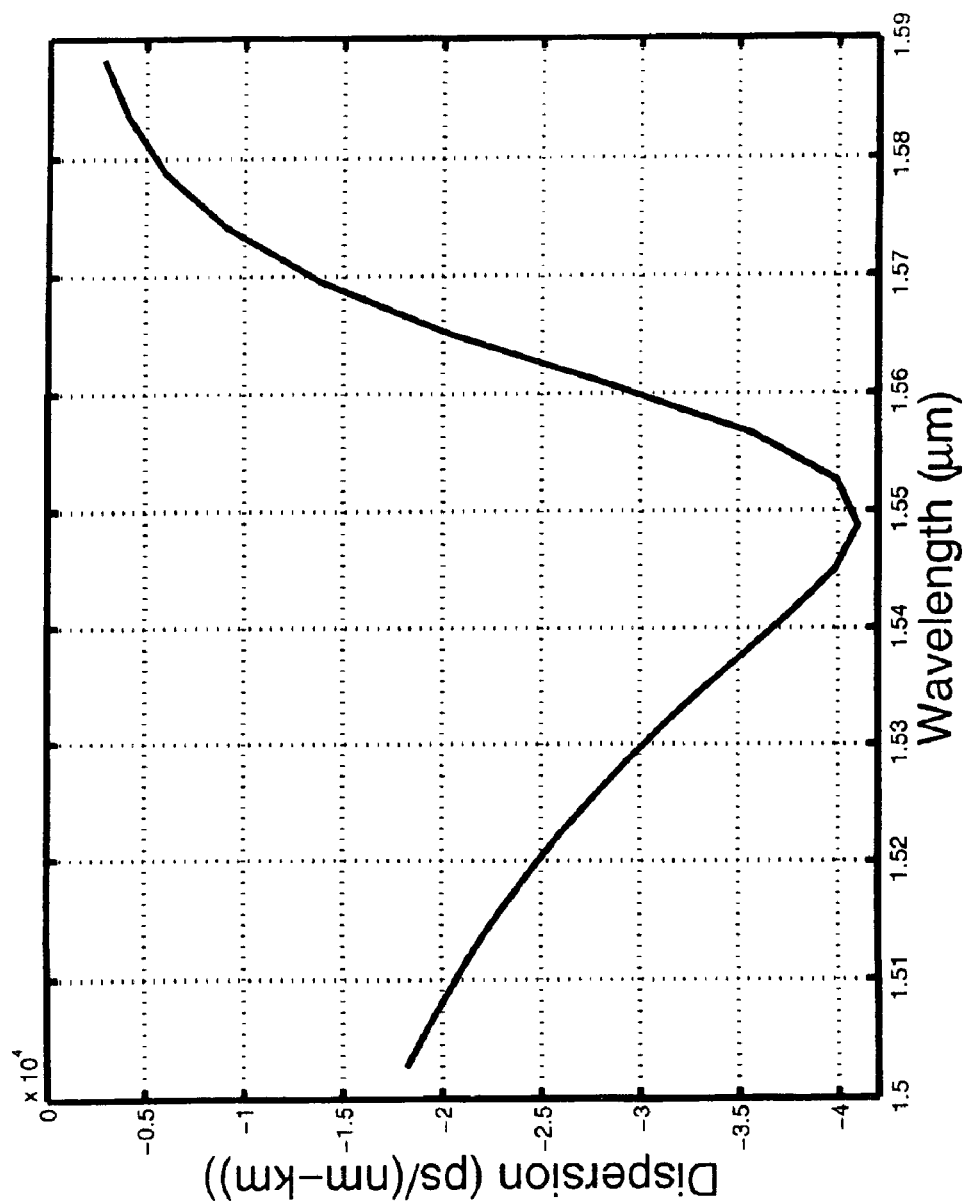
FIG. 12 is a graph of dispersion D for a mode of a dispersion compensation Bragg fiber.
Figure 13:
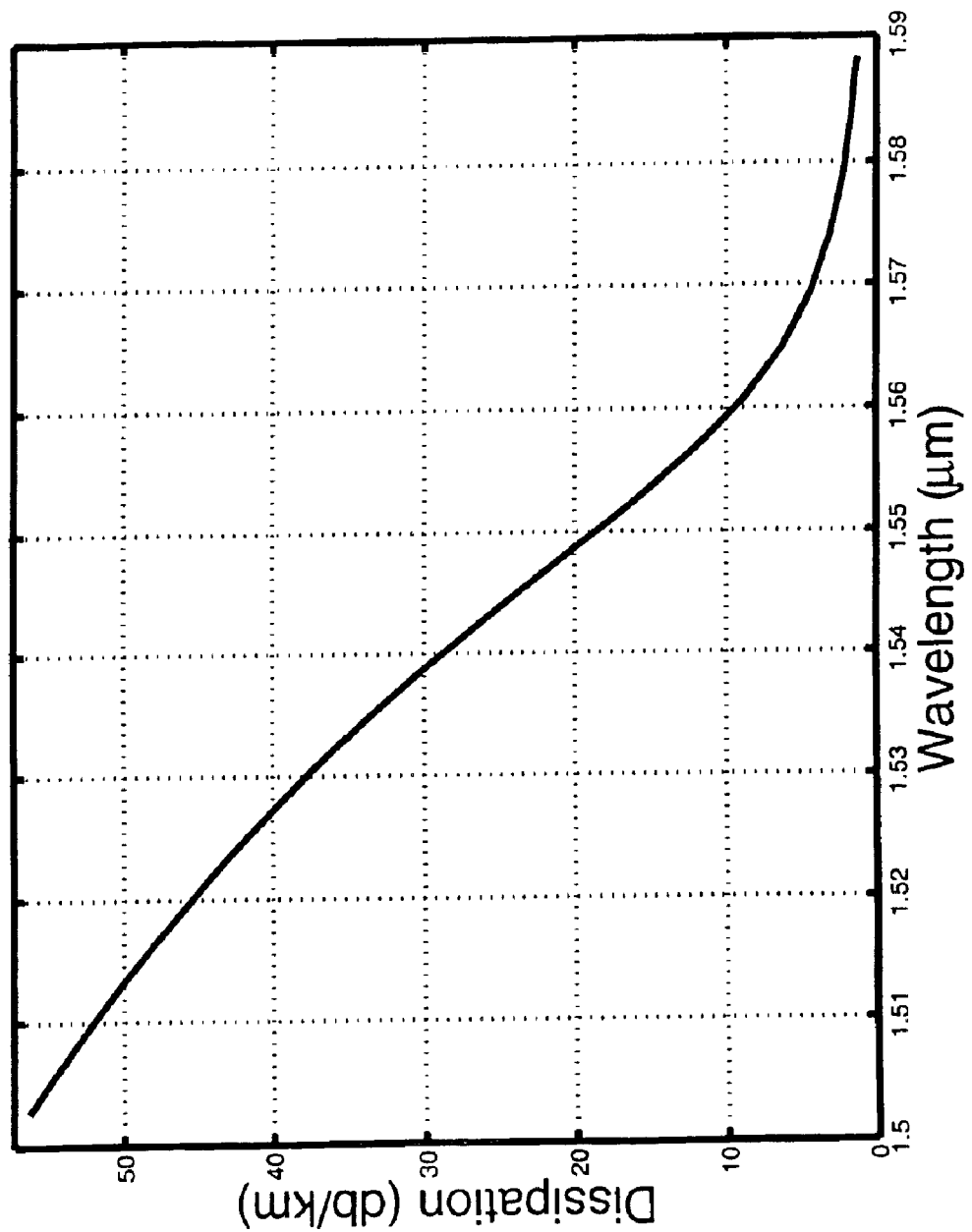
FIG. 13 is a graph of dissipation losses for a mode of the dispersion compensation Bragg fiber.
Figure 14:
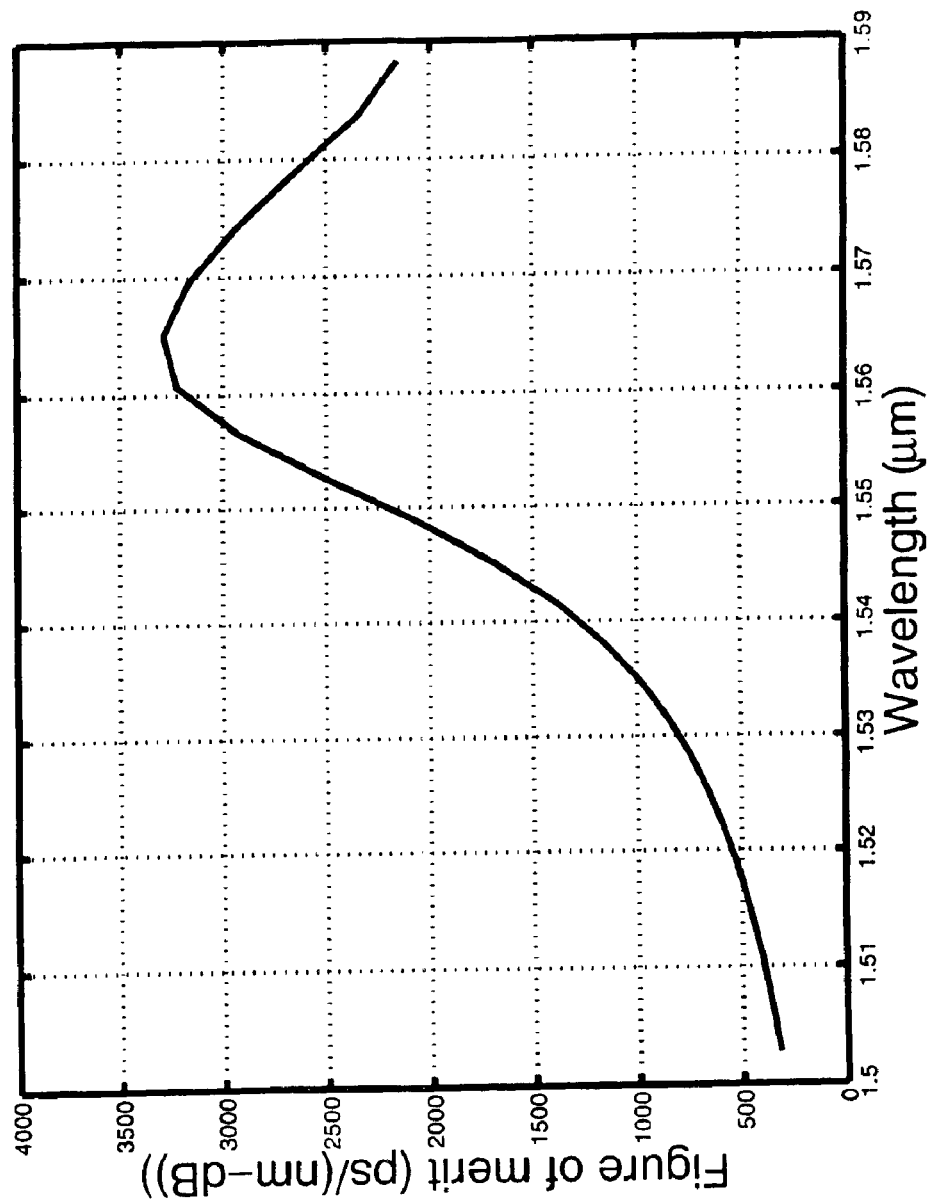
FIG. 14 is a graph of the figure of merit (FOM) for a mode of the dispersion compensation Bragg fiber.

In another example, the thicknesses of layers 928 can be optimized to produce a very large dispersion in the middle of the bandgap (i.e., around 1.55 microns). In particular, FIG. 12 shows dispersion D as a function of wavelength around 1.55 microns for fiber 900, where the thickness of the innermost high-index layer (n=2.8) is 0.376 microns, the thicknesses of the remaining high-index layers (n=2.8) are 0.173 microns, and the thicknesses of the low-index layers (n=5) are 0.406 microns (where the working mode is derived from the $TE_{01}$ mode in the core). As shown in FIG. 12, these parameters produce a dispersion D=−41,000 ps/(nm-km) over a bandwidth of about 15.0 nm. Dissipation caused by material absorption in layers 928 (and to a much lesser extend dissipation in the subsequent layers of the confinement region) over the same wavelength range is shown in FIG. 13, where again we assume a material dissipation rate of 0.1 dB/m in these cladding layers. This results in a figure of merit (FOM) that varies between 1,300 ps/(nm-dB) and 3,200 ps/(nm-dB) across the 15 nm bandwidth as shown FIG. 14.

Figure 15:
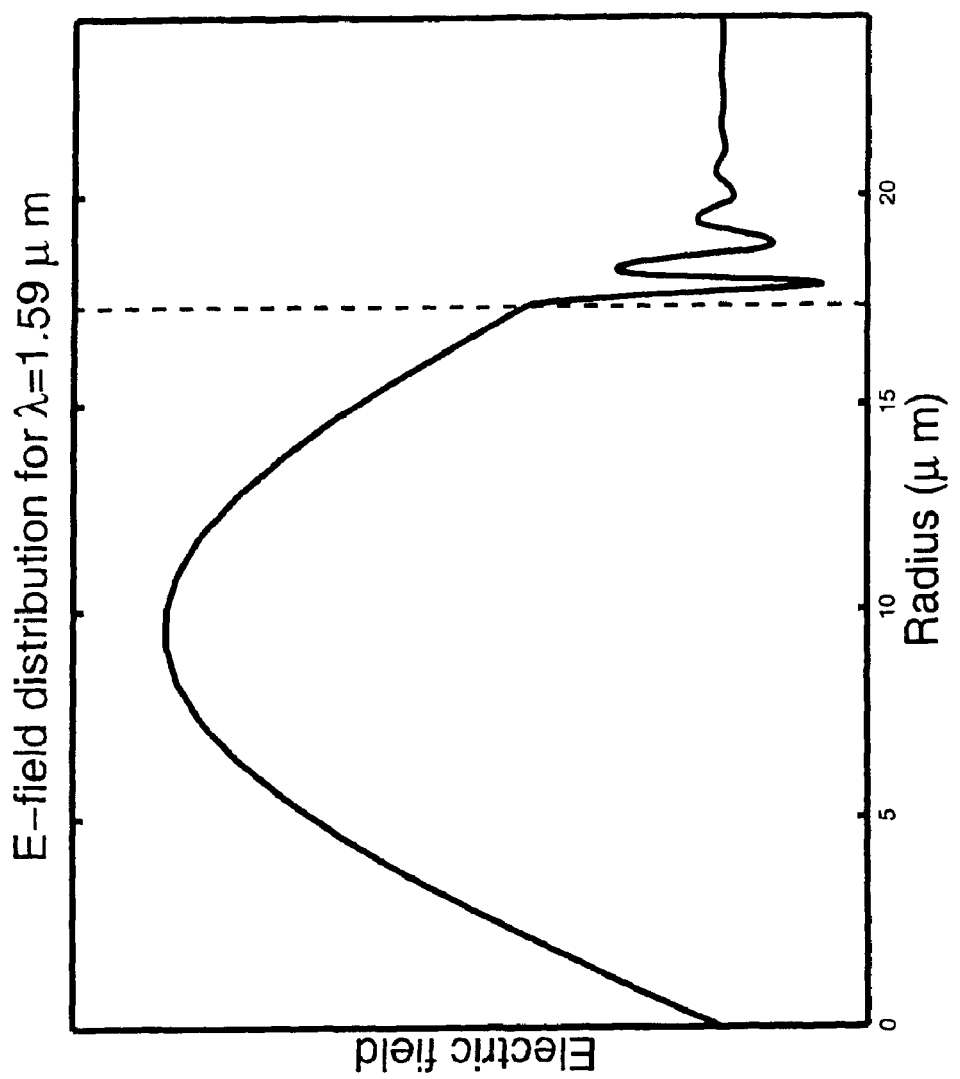
FIG. 15 is a graph of the electric field distribution for a mode for the dispersion compensation Bragg fiber at 1.59 microns.
Figure 16:
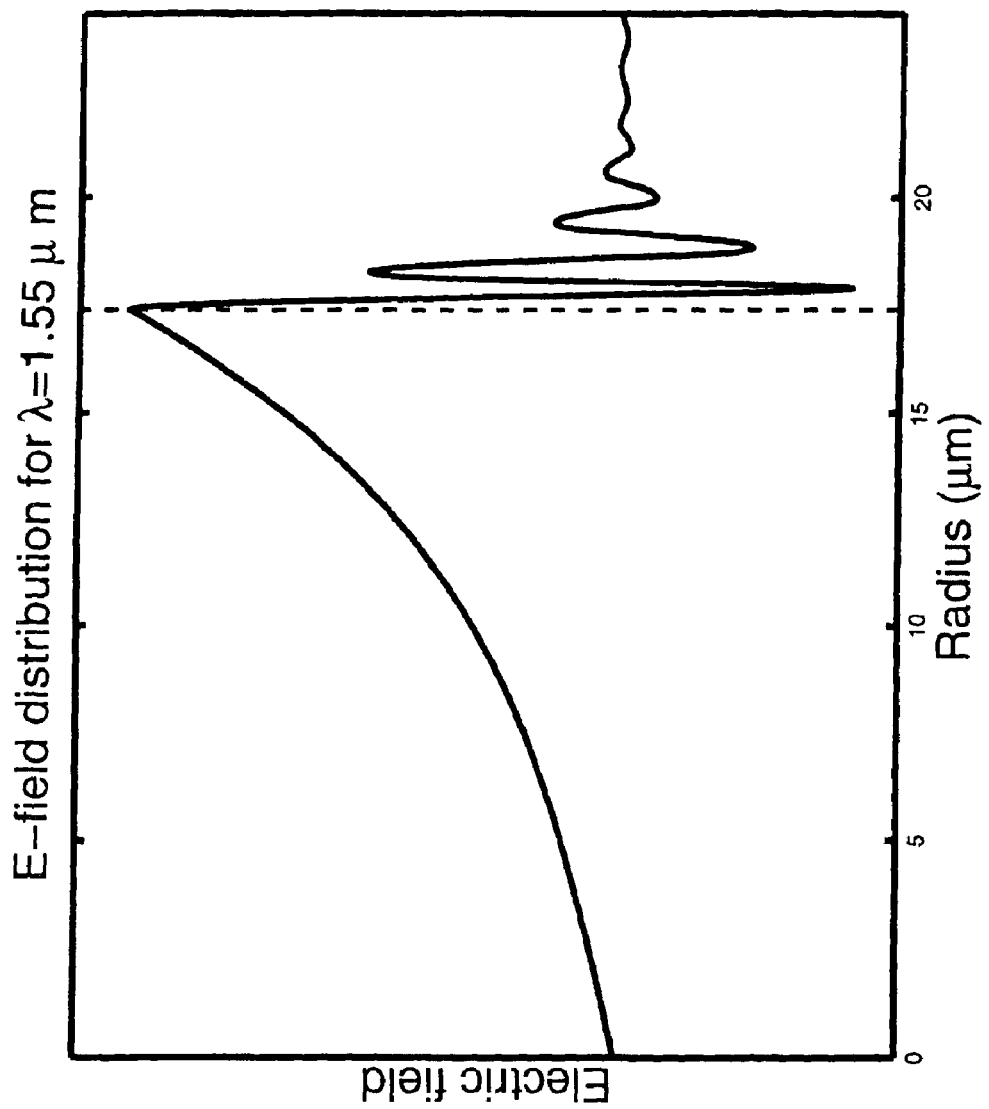
FIG. 16 is a graph of the electric field distribution for a mode for the dispersion compensation Bragg fiber at 1.55 microns.

In this example, the large dispersion is caused by the interaction between a mode substantially confined to the core and a substantially localized mode introduced by the dispersion tailoring region, whose average index is significantly greater than that of the core. The interaction produces the working mode having the tailored dispersion properties. As the wavelength changes, the character of the working mode changes from one substantially confined to the core, to one that extends into the dispersion tailoring region. For example, FIGS. 15 and 16 show the electric field distribution for the working mode in this example at wavelengths 1.59 microns and 1.55 microns, respectively.

In additional embodiments, the dispersion tailoring region may be formed by a variation in thickness to one or more of the layers that are many layers removed from the core. In other words, the "defect" that produces the dispersion tailoring region may be in the middle of what was the confinement region. In such a case, we refer to the dispersion tailoring region as including all of the layers from the core through to and including the layer(s) that introduce the defect. The remaining layers surrounding the defect form the confinement region and define the bandgap for the dielectric regions therein. Furthermore, in additional embodiments, the dispersion tailoring region may be formed by changing the index of one or more of the layers, instead of, or in addition to, changing the thickness of one or more of the layers. In yet further embodiments, the dispersion tailoring region may have a more complex geometry than one or more layers surrounding the waveguide axis. For example, where the confinement region involves a photonic crystal structure having a two-dimensional index modulation (e.g., a honeycomb structure), the dispersion tailoring region may be a dielectric region that introduces a defect in that index modulation.

Figure 17:
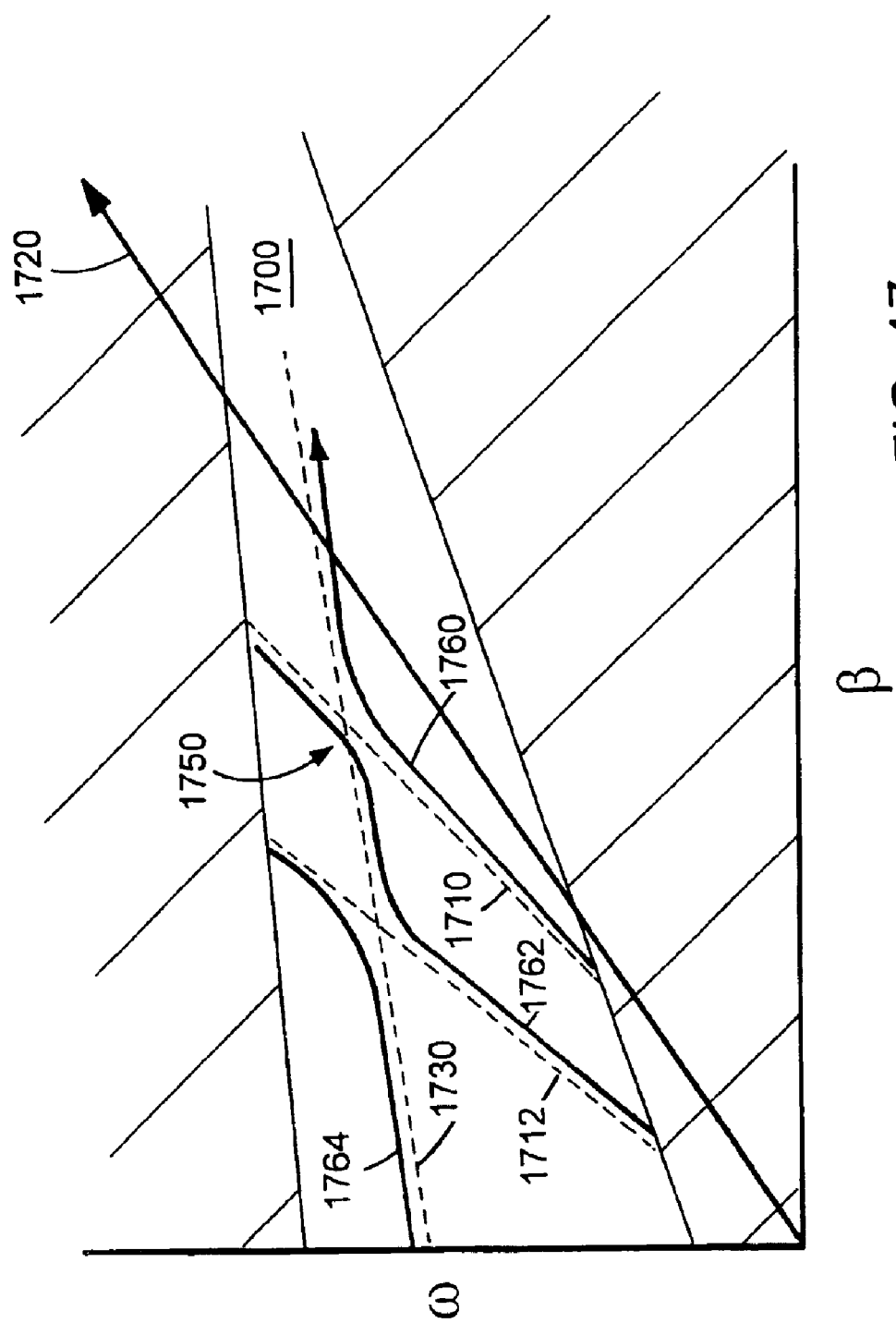
FIG. 17 is a representative band diagram for a photonic crystal fiber 100 having a dispersion tailoring region 130.

In general, therefore, the dielectric dispersion tailoring region is a region surrounded by the confinement region, which introduces at least one mode into the bandgap of the confinement region that interacts with a guided core mode to produce the working mode having the tailored dispersion profile. We note that in some embodiments, the dispersion tailoring region may also include multiple disconnected subregions. Qualitatively, the interaction can be understood with reference to the schematic band diagram shown in FIG. 17 for waveguide 100, which assumes, for example, that that the average index of the core is less than that of the dispersion tailoring region. Referring to FIG. 17, the confinement region defines at least one photonic bandgap 1700. In the absence of the dispersion tailoring region, the confinement region guides at least one core mode 1710 (dotted line) in the core within the bandgap. That core mode 1710 lies above the light line 1720. In the absence of any interaction with core mode 1710, the dispersion tailoring region introduces at least one defect mode 1730 (dotted line) into the bandgap. Because the defect mode has an average index greater than that of the core, the defect mode may cross over light line 1720. At frequencies where defect mode 1730 lies below the light line, the defect mode is a surface state substantially localized in the dispersion tailoring region. The surface state is effectively confined on one side by the photonic bandgap of the confinement region, and on the other side by total internal reflection from the core. By ignoring the interaction between the modes, we can refer to modes 1710 and 1730 as "unperturbed modes." As shown in FIG. 17, the unperturbed modes cross one another in a region 1750 of frequency and wavevector space. It is in region 1750 that the unperturbed modes in fact interact with one another to form the actual modes of the waveguide. In particular, the interaction gives rise to a lower-frequency mixed mode 1760 (solid line) whose characters change between core-like and defect-like modes as a function of wavevector. FIG. 17 shows an inflection point in mixed mode 1760, which corresponds to a point of zero dispersion. Moreover, mixed mode 1760 extends below light line 1720, where it is a surface state.

Additional guided modes may also interact with defect mode 1730. For example, FIG. 17 shows an additional "unperturbed" core mode 1712, which interacts with defect mode 1730. As a result, there are three mixed modes, low-frequency mixed mode 1760 described above and also mixed modes 1762 and 1764 (solid lines). The character of mixed mode 1764 changes from that of unperturbed defect mode 1730 at smaller wavevectors to that of unperturbed core mode 1712 at larger wavevectors. The character of mixed mode 1762 changes from that of unperturbed core mode 1712 at smaller wavevectors, to that of unperturbed defect mode 1730 over an intermediate range of wavevectors, and then to that of unperturbed core mode 1710 at larger wavevectors. Notably, mixed modes 1762 and 1764 also exhibit an inflection point and sharp changes in dispersion. In addition, mixed mode 1762 changes character from a core-like mode to a defect-like mode in a phase-space region above the light line. Any of mixed modes 1760, 1762, and 1764 may be used as a working mode for optical transmission and/or dispersion compensation.

In further embodiments, it is also possible to adjust the parameters of the dispersion tailoring region 130 to create multiple working modes, each having a tailored dispersion profile. For example, the size of the dispersion tailoring region can be made large enough (e.g., comparable to the size of the core) to introduce multiple defect modes, each of which interact with a guided core mode to the produce the multiple working mode. In the following example, we provide parameters for waveguide 100 that provide multiple working modes each having a point of zero dispersion at a different wavelength. Such a waveguide could be used in a WDM transmission system where each wavelength channel corresponds to one of the points of zero dispersion. If necessary, the channels may be spaced far enough apart to limit channel cross-talk caused by nonlinear interactions such as four-wave mixing (FWM).

In this particular example, the structure is optimized to produce points of zero dispersion at $\lambda \approx 1239$, 1308, 1387, 1477, 1579, 1697, 1834 and 1992 nm. The parameters are as follows: i) gas core (n=1) of radius 14.84 $\mu$m defining core region 110; ii) a dielectric layer surrounding the core having n=1.5 and a thickness of 9.9 $\mu$m defining the dispersion tailoring region 130; and iii) 34 layers of alternating index n=2.8/1.5 and thicknesses 0.148/0.347 $\mu$m, respectively, defining confinement region 120.

Figure 18:
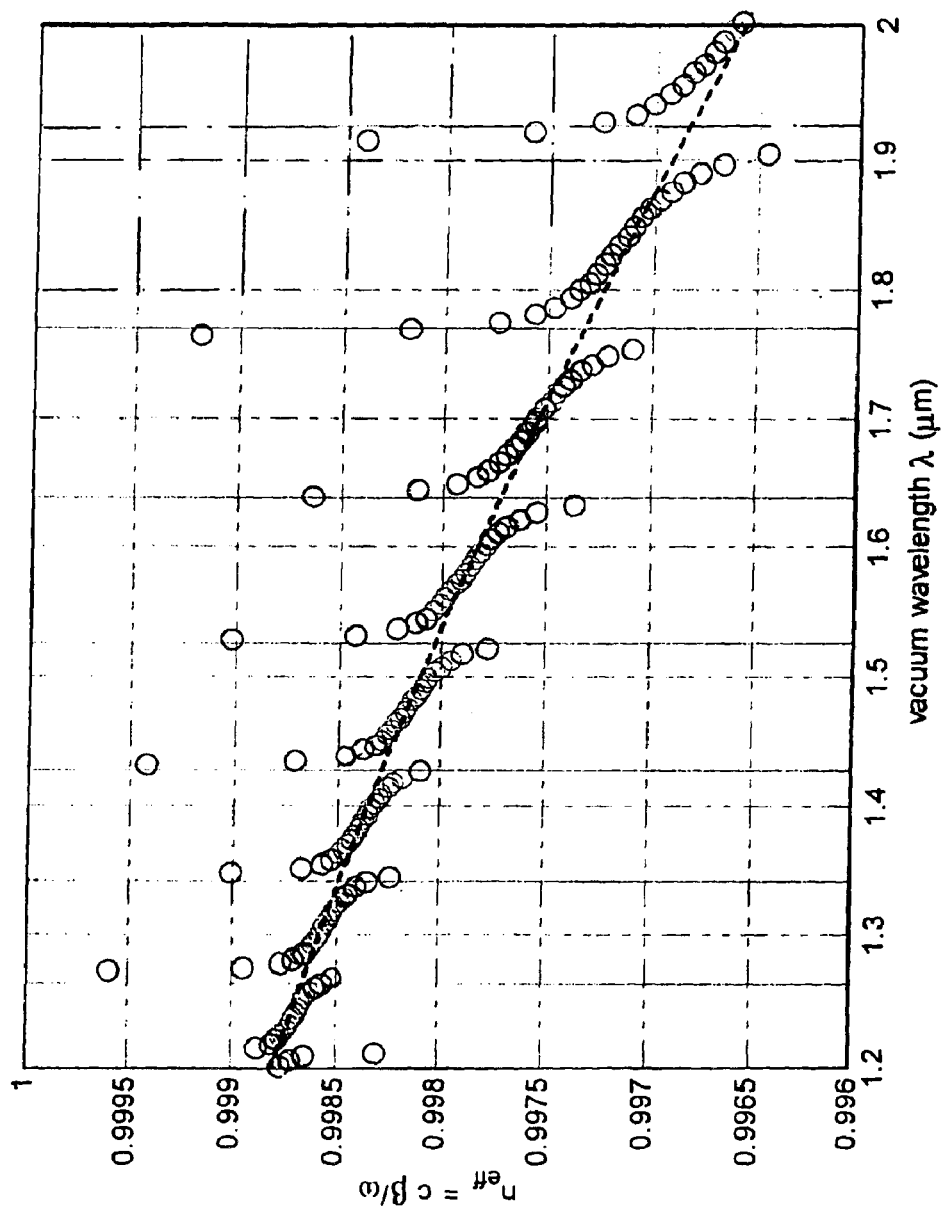
FIG. 18 is a graph of the dispersion (circles) for a Bragg fiber having multiple working modes each having a tailored dispersion profile as compared to that (dashed line) of a Bragg fiber without a dispersion tailoring region.

As in the previous examples, absent the dispersion tailoring region, the core supports at least one mode guided along the waveguide axis by the confinement region. Moreover, even where the core supports multiple modes, differential losses among the multiple modes typically produces a modal filter that preserves only the lowest loss core mode (e.g., the $TE_{01}$ mode) when the waveguide is sufficiently long, thereby effectively providing single mode operation. In the presence of the dispersion tailoring region, this core mode interacts with the defect modes introduced by the dispersion tailoring region, which are partially guided in the dispersion tailoring region. As a result, we use the interaction between the guided core mode and the multiple defect modes to produce multiple discontinuous working modes and forces each working mode to have a region where dispersion D passes through zero. More generally, we can use the interaction to tailor the dispersion relation, $\omega(\beta)$, of the working mode. FIG. 18 compares the effective index of the $TE_{01}$ core mode (thick dashed line), which ignores any interaction with the dispersion tailoring region, and the resulting effective index for the multiple working modes (circles) when the interactions with the defect modes are taken into account. Notably, each working mode approaches the behavior of the core mode until it is forced to change by the interaction with modes of the dispersion tailoring region.

Thus, the interaction between the core mode(s) with modes that are at least partially guided in the dispersion tailoring region produce regions in which the resulting working modes have mixed behavior. In particular, the working modes are forced to have some wavelengths in which they effectively behave like a mode that is guided through the dispersion tailoring region and other wavelengths in which they behave like a core mode. This discontinuous behavior forces the working modes to have the desired characteristics at multiple wavelengths. Accordingly, in this example, the presence of the dispersion tailoring region produces multiple working modes that provide oscillatory penetration of the field into the high-index dispersion tailoring region from the low-index core.

Figure 19:
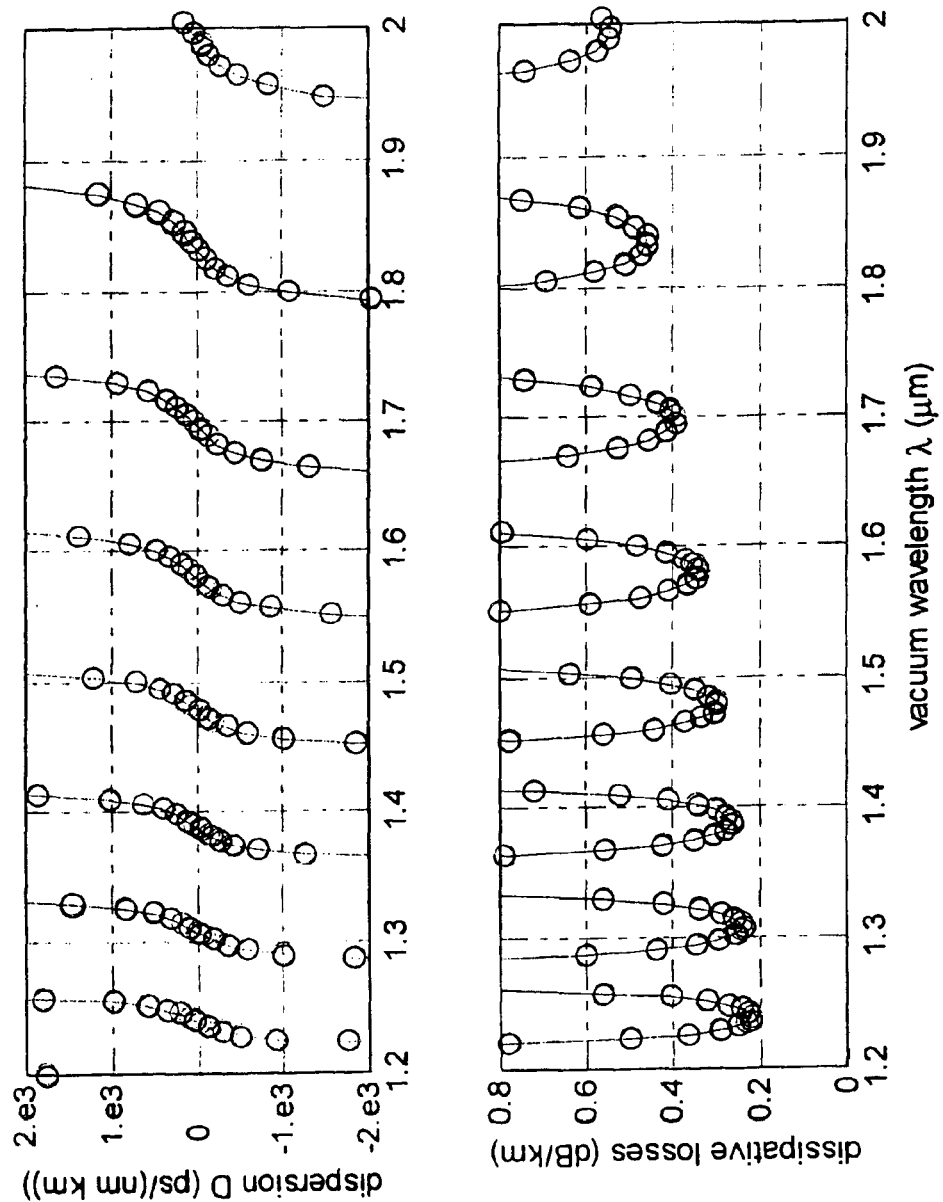
FIG. 19 is a graph of dispersion D (top panel) and dissipation losses (bottom panel) for the Bragg fiber having multiple working modes.

FIG. 19 shows the dispersion (top panel) and dissipative losses (bottom panel) for the multiple working modes. Loss calculations are performed assuming material losses are around 0.1 dB/m, which are typical for chalcogenide glasses that can achieve the high indices assumed.

An additional advantage of the waveguide in this example is that discontinuities of the multiple working modes produce a sort of "inter-channel" dispersion, with different working modes traveling at different velocities at their points of zero dispersion. Thus, while each individual wavelength channel sees "zero" dispersion, the multiple channels are not phase-matched and thus minimize nonlinear effects. Furthermore, in this example, the dispersion tailoring region is used not only to control the number and position of zero dispersion wavelengths, but is also used to control and limit the slope of dispersion at these wavelengths to be below 35 ps/(nm²km), thereby minimizing higher-order pulse broadening at each WDM wavelength channel.

In additional embodiments, the thickness of the dispersion tailoring region may be optimized so that each of the multiple working modes have a large dispersion value and a small dissipative loss at a corresponding WDM wavelength channel. In yet further embodiments, the confinement region of the multiple working-mode waveguides described above may be replaced with a confinement region based on an index-guiding TIR mechanism. In such embodiments, the confinement region may include a single dielectric layer having an index smaller than those of the core and the dispersion tailoring region.

Thus, the features of multiple working-mode waveguides may be summarized as follows: i) a core region supporting single or multi-mode behavior; ii) a dispersion tailoring region that supports periodic penetration of energy from the core mode(s) into the dispersion tailoring region to produce the multiple working modes; and iii) a photonic crystal or index guiding confinement region, which substantially confines light to the core and dispersion tailoring region.

We note that in all of the dispersion calculations above, we have calculated only waveguide dispersion and neglected material dispersion. The precise value of such material dispersion will depend on the precise material constituents and the frequency of the working mode in question. In general, however, the magnitude of any material dispersion is small (e.g., about 30 ps/(nm km)) relative to the magnitude of the designable changes in waveguide dispersion produced by the dispersion tailoring region. Thus, whatever the material dispersion in a particular realization of the waveguide, it typically introduces only a small shift in the overall dispersion of the waveguide, and one that can be easily accounted for when designing the dispersion tailoring region.

In general, computational methods known in the art can be used to determine the modal properties of the dielectric waveguides described herein. Furthermore, iterative calculations may be used to determine waveguide specifications that optimize selected waveguide properties. We outline below some of the basic physics that underlie such calculations. In particular, the EM modes supported by a structure can be solved numerically according to Maxwell's equations and the boundary conditions for the structure. Furthermore, for an all-dielectric, isotropic structure, Maxwell's equations can be reduced to:

$$\nabla \times \left(\frac{1}{\varepsilon(r)} \nabla \times H(r)\right) = \left(\frac{\omega^2}{c^2}\right) H(r) \qquad (2)$$

$$\nabla \cdot H(r) = \nabla \cdot E(r) = 0 \qquad (3)$$

$$E(r) = \left(\frac{-ic}{\omega \varepsilon(r)}\right) \nabla \times H(r), \qquad (4)$$

where H and E are the macroscopic magnetic and electric fields, respectively, and $\in$ is the scalar dielectric constant for the structure. To solve for the EM modes of such a structure, one solves the eigenvalue equation given by Eq. 2 (where H is the eigenfunction and $\omega^2/c^2$ is the eigenvalue) subject to the divergence equation, Eq. 3, to give H. Thereafter, one can determine E from H according to Eq. 4.

Often symmetry can be used to simplify the solution. For example, with respect to many of the particular example described herein, we may assume continuous translational symmetry (i.e., a uniform cross-section) along the waveguide axis, which we shall denote as the z-axis. Of course, in practice the structures may have small deviations from such uniformity. Moreover, the structures will have a finite spatial extent. Nonetheless, based on the assumption of a uniform cross-section for some length that is large relative to the waveguide diameter, the EM modes supported by the waveguides can be written schematically as $F(x,y,z)=\exp[i(\beta z-\omega t)]F(x,y)$, where F is any of the electromagnetic field components. The parameter $\beta$ in the expression for F is the wavevector along the waveguide axis.

The multilayer waveguides described above may be fabricated using multilayer co-drawing techniques, co-extrusion techniques, or deposition techniques. Suitable high-index materials may include chalcogenide glasses such as binary and ternary glass systems, heavy metal oxide glasses, amorphous alloys, and high-index doped polymers. Suitable low-index materials may include oxide glasses such as borosilicate glasses, halide glasses, and poymers such as polystyrene. In addition, low-index regions may be fabricated by using hollow structural support materials, such as silica spheres or hollow fibers, to separate high-index layers or regions.

Figure 20:
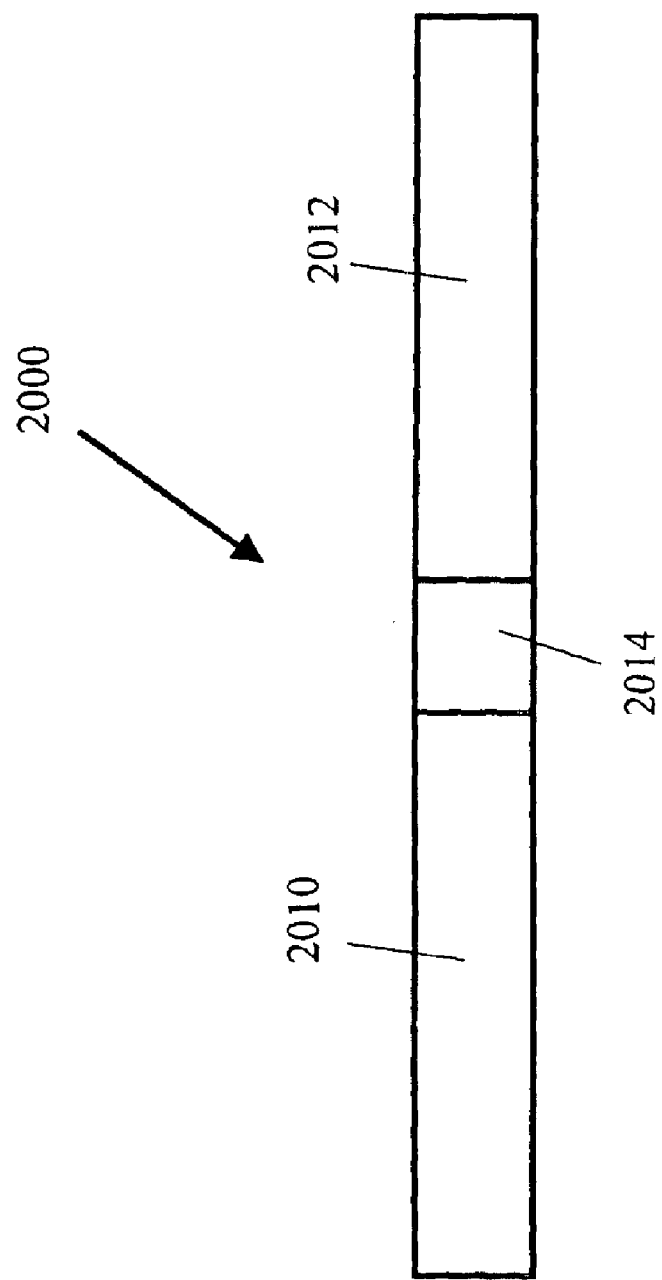
FIG. 20 is a schematic diagram of a composite waveguide 2000 including multiple waveguide segments 2010 and 2012.

In all of the particular embodiments described above, we have assumed that the waveguide has a uniform cross-section along the waveguide axis. However, in further embodiments, the waveguide cross-section may not remain uniform. For example, referring to FIG. 20, a composite waveguide 2000 includes multiple segments 2010 and 2012 having different index cross-sections. Composite waveguide 2000 may further include a coupling segment 2014 between segments 2010 and 2012, where the index cross-section of coupling segment 2014 smoothly varies between those of segments 2010 and 2012 to adiabatically connect the modes supported in segments 2010 and 2012. The multiple segments in composite waveguide 2000 provide additional degrees of freedom for tailoring its aggregate dispersion. Thus, each segment may be selected to provide a particular contribution to the aggregate dispersion of the composite waveguide.

In one example, segments 2010 and 2012 may have index cross-sections that are identical but for a uniform scaling factor, e.g., the core and layer thicknesses in segment 2012 are each adjusted by a constant amount relative to the corresponding region in segment 2010. Such an adjustment may be produced by varying the drawing speed in a multi-layer extrusion process used to form the multilayer waveguide. For example, a first drawing speed may be used to form the first segment, a smooth transition from the first drawing speed to a second drawing speed may be used to form the coupling segment, and the second drawing speed may be used to form the second segment.

The use of a uniform scaling factor between segments is particularly useful in an analytical sense because the dispersion properties of each segment scale accordingly. This follows directly from Maxwell's equations, which are scalable. As a result, if a waveguide has a dispersion function $D_n(\lambda)$ for each mode "n" supported by the waveguide, and the dimensions of the index cross-section of the waveguide are then uniformly scaled by a factor "c," the resulting dispersion function for the scaled structure would be $D_n(\lambda/c)/c$. As a result, a single dispersion curve may be used to generate an entire family of similarly shaped, but differently scaled dispersion curves. Thus, we can optimize the overall performance of composite waveguide 2000 by adding together multiple curves corresponding to multiple segments (e.g., segments 2010 and 2012), which have cross-sections slightly scaled with respect to one another.

Figure 21:
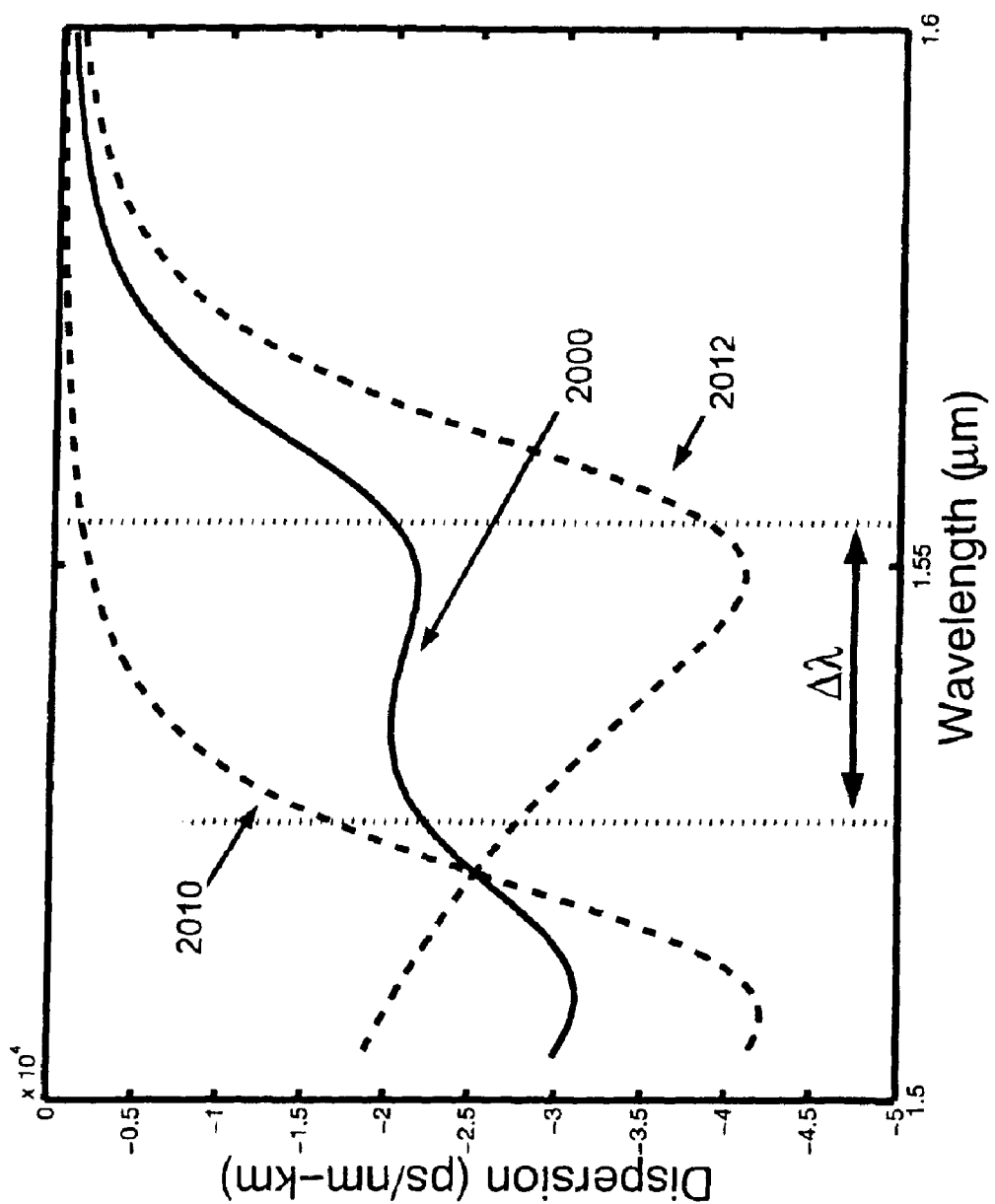
FIG. 21 is a graph of the aggregate dispersion D (solid line) for the composite waveguide 2000 and the dispersion D (dashed lines) for the individual segments.

For example, in FIG. 21 we show the aggregate dispersion (solid curve) for a composite waveguide formed from a first segment having an index cross-section identical to that of the structure described in reference to FIGS. 10–16 above, and a second equal-length segment having the same index cross-section but for a scaling factor of 1.0275. Dispersion curves are also shown for the individual segments (dashed curves) in FIG. 21. FIG. 21 shows that the bandwidth for dispersion compensation can be broadened from 15.0 nm to 28.5 nm. More generally, the example demonstrates additional degrees of freedom for generating a tailored aggregate dispersion curve over a larger wavelength range. In particular, by adding several dispersion curves together in a systematic fashion, one can tailor the aggregate dispersion curve to match and compensate an arbitrary dispersion profile over a broad wavelength range. Thus, for example, the approach may be used to provide dispersion compensation at each of the multiple wavelength channels of a WDM transmission fiber. Moreover, the approach may be used to optimize the FOM over a larger bandwidth because the different segments will have different dissipation losses. For example, in the case of the composite waveguide described above, the bandwidth is increased by a factor of 2, but the minimum figure of merit in the bandwidth is reduced from 1300 ps/(nm–dB) to only 970 ps/(nm–dB).

We note that while such composite fibers provide additional degrees of freedom for matching dispersion profiles, even dispersion compensating fibers that have a single uniform cross-section may be used to match a desired dispersion profile. In particular, the photonic waveguide fibers described herein not only provide large absolute values of dispersion, they also provide a wide range of dispersion slopes over the range of guided frequencies, as shown, for example, in FIG. 12. Moreover, the scaling principle described in the previous paragraphs can be used to adjust the length scale of the photonic waveguide fiber to thereby tune a desired slope to a particular wavelength range. Once the dispersion slope is matched, a single length of the dispersion compensating fiber can be selected to substantially cancel dispersion over that wavelength range.

Figure 22:
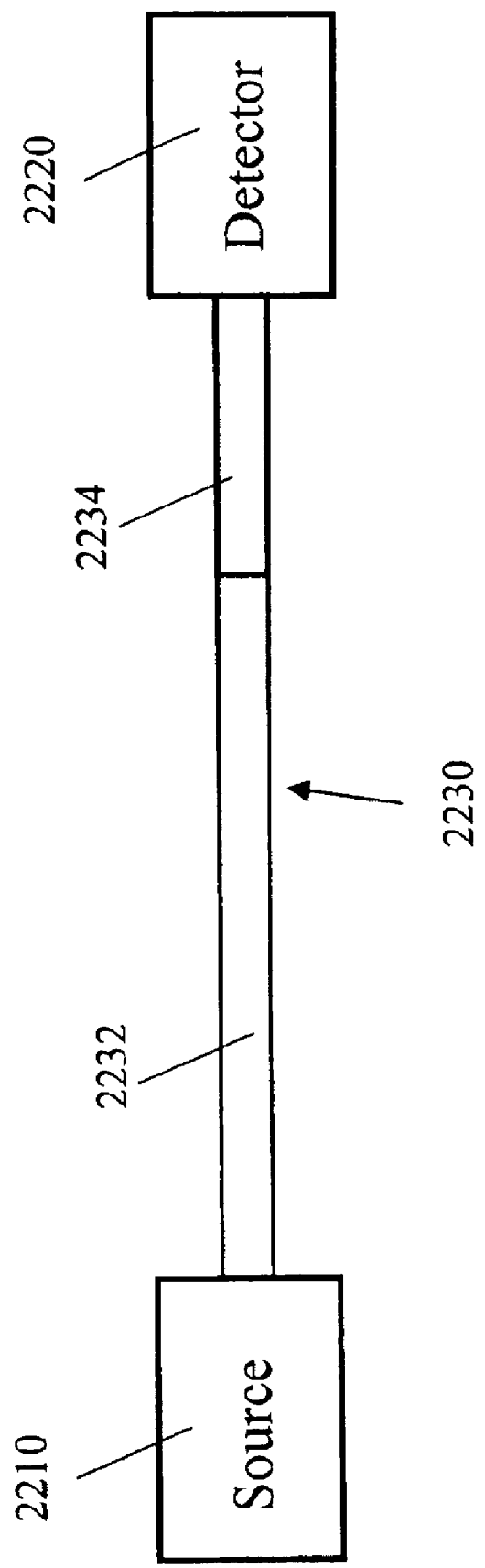
FIG. 22 is a schematic diagram of an optical telecommunication system that implements one or more of the waveguides described herein having tailored dispersion profiles.

The optical waveguides described herein may be used in optical telecommunications systems. FIG. 22 shows a schematic diagram of an optical telecommunication system 2200 including a source node 2210 and a detection node 2220, which are coupled to one another by an optical transmission line 2230. The optical transmission line may include one or more segments of transmission fiber 2232 and one or more segments of dispersion compensation fiber 2234. Source node 2210 may be the original source of an optical signal directed along the transmission line or it may be an intermediate node that redirects the optical signal to transmission line 2230, optically amplifies it, and/or electronically detects it and optically regenerates it. Furthermore, source node 2210 may include components for multiplexing or demultiplexing multiple optical signals at different wavelengths. Similarly, detector node 2220 may be the final destination for the optical signal transmitted along the transmission line, or it may be an intermediate node that redirects, optically amplifies, and/or electrically detects and optically regenerates the optical signal. In addition, detector node 2220 may also include components for multiplexing or demultiplexing multiple optical signals at different wavelengths. The dispersion compensation fiber(s) may be positioned to pre-compensate or post-compensate for dispersion in the optical signal caused by the transmission fiber(s). Furthermore, the optical signal transmitted along the transmission line may be a WDM signal that includes multiple signals at corresponding wavelengths. Suitable wavelengths for the system include those within a range of about 1.2 microns to about 1.7 microns, which corresponds to many long-haul systems in use today, as well those within a range of about 0.7 microns to about 0.9 microns, which corresponds to some metro systems currently being considered.

In some embodiments of the system, the transmission fiber may be one of the waveguides described herein. For example, the transmission fiber may be a waveguide with a dispersion-tailoring region that guides the optical signal and produces zero dispersion at one or more wavelengths of the guided optical signal, as described above. For example, when the photonic crystal waveguides are used as the transmission fiber, nonlinear interactions that cause channel cross-talk can be made small by selecting the core material (where the majority of the optical energy is located) to be a material with a small nonlinear interaction coefficient (e.g., the core may be hollow). Because the nonlinear interactions are small, system 2200 can be operated at wavelengths that have small or even zero dispersion. Furthermore, when the waveguides having zero dispersion at multiple wavelengths are used, group velocity differences at those multiple wavelengths may limit channel cross talk caused by nonlinear interactions. In addition, the wavelengths corresponding to the multiple wavelengths of zero dispersion may be spaced far enough apart to limit channel cross talk caused by nonlinear interactions. Thus, when using waveguides described herein as the transmission fiber, the transmission line can operate zero (or at least very small) dispersion for one or more wavelength channels of the WDM signal. Accordingly, dispersion compensation may not even be necessary, obviating the need for dispersion compensating fiber 2234. Nonetheless, the dispersion-compensating fiber may be used for very large lengths optical transmission fiber where even small amounts of dispersion eventually accumulate.

In further embodiments of the system, the dispersion-compensating fiber may be one of the waveguide fibers described herein. For example, the dispersion tailoring region in such a fiber may be selected to produce large absolute values of dispersion, such as a value greater than 200 ps/(nm–km), which is comparable to dispersion compensating fibers commercially available today. Moreover, the fibers described herein can produce much larger values of dispersion, e.g., greater than 1,000 ps/(nm–km), or even greater than 10,000 ps/(nm–km). The fibers described herein can be designed to match a desired dispersion over a large bandwidth (e.g., bandwidths greater than about 10 nm, or greater than even 100 nm). Furthermore, the dissipative losses for the waveguides described herein can be made small relative to the dispersion they impart. For example, the figure of merit (FOM) for the dispersion compensating fibers described herein can be greater than 200 ps/(nm–dB), or even greater than 500 ps/(nm–dB), over bandwidths greater than 10 nm. When the dispersion compensating fibers described herein are used in system 2200, the transmission fiber may correspond to conventional index-guided fibers (e.g., silica optical fibers) or they may correspond to transmission fibers described herein. The compensation scheme may include one or more of pre-compensation, post-compensation, and inline compensation.

Finally, we briefly address coupling between the transmission and dispersion-compensating fibers described herein and adjacent fibers and/or optical systems connected at their respective ends. Generally, the coupling efficiency between respective modes of fibers connected to one another is proportional to the degree to which a mode in the first fiber overlaps spatially with a mode in the second fiber. In the photonic crystal fibers described herein, the lowest-loss mode is typically associated with the $TE_{01}$ mode. Accordingly, for applications where the photonic crystal fiber has a long length, operating with the $TE_{01}$ mode is preferable. On the other hands, long fiber lengths are not typically necessary for dispersion compensation. Therefore, for dispersion compensation it may be preferable to operate with a mode that minimizes coupling losses between the dispersion compensating fiber and the transmission fiber. For example, index-guided silica fibers usually operate with the doubly degenerate $HE_{11}$ mode (which may correspond to, for example, linearly polarized light at the core center). Such a mode may not overlap well with the $TE_{01}$ mode, which has an azimuthal symmetry and has an electric field distribution that is maximized at a distance from the core center. However, the photonic crystal fibers described herein also support an $EH_{11}$ or an $HE_{11}$ guided mode that does overlap well with the $HE_{11}$ mode in the conventional optical fiber. Thus, the dispersion tailoring region can be selected to interact with that mode to produce the working mode(s) having the desired dispersion properties.

Alternatively, or in addition a mode-coupling region may used to optimize coupling between a first mode in a first fiber and a second mode in a second fiber. For example, to couple to an m=1 working mode from one of the photonic crystal fibers described herein to the $HE_{11}$ mode of silica optical fiber, the silica fiber may include a mode coupling region whose index cross-section changes with axial position to smoothly couple the working mode to the $HE_{11}$ mode. In one example, the coupling region may have a hollow ring-shaped cross-section that index-guides light within the ring cross-section and subsequently fills in along the axial direction to form a conventional optical fiber. The ring diameter and thickness would be selected to optimize coupling from the working mode, whose field distribution is maximized at some distance from the core center. In another example, the cross-section of the silica fiber in the coupling region could be doped with impurities to optimize coupling, e.g., the doping could form a ring-shaped pattern. The doping pattern would gradually be phased out over the axial extent of the coupling region. Furthermore, in other embodiments, it may be the photonic crystal fiber that includes the coupling region.

A number of embodiments of the invention have been described. Nevertheless, it will be understood that various modifications may be made without departing from the spirit and scope of the invention. Accordingly, other embodiments are within the scope of the following claims.

What is claimed is:

1. An optical waveguide having a working mode with a tailored dispersion profile, the waveguide comprising:

a dielectric confinement region surrounding a waveguide axis, the confinement region comprising a photonic crystal having at least one photonic bandgap, wherein during operation the confinement region guides EM radiation in a first range of frequencies to propagate along the waveguide axis;

a dielectric core region extending along the waveguide axis and surrounded by the confinement region about the waveguide axis, wherein the core supports at least one guided mode in the first frequency range; and a dielectric dispersion tailoring region surrounded by the confinement region about the waveguide axis, wherein the dispersion tailoring region introduces one or more additional modes in the first range of frequencies that interact with the guided mode to produce the working mode.

2. The waveguide of claim 1, wherein the core has an average refractive index smaller than that of the highest index constituent of the dielectric confinement region.

3. The waveguide of claim 1, wherein the average refractive index of the core is less than 1.1.

4. The waveguide of claim 1, wherein the core comprises a gas.

5. The waveguide of claim 1, wherein the confinement region comprises at least two dielectric materials having different refractive indices.

6. The waveguide of claim 5, wherein the ratio of the refractive index of the higher index dielectric material to that of the lower index dielectric material is greater than 1.1.

7. The waveguide of claim 6, wherein the ratio of the refractive index of the higher index dielectric material to that of the lower index dielectric material is greater than 1.5.

8. The waveguide of claim 7, wherein the ratio of the refractive index of the higher index dielectric material to that of the lower index dielectric material is greater than 2.

9. The waveguide of claim 5, wherein the two dielectric materials in the confinement region form the photonic crystal.

10. The waveguide of claim 5, wherein the confinement region comprises alternating layers of the two dielectric material surrounding the core about the waveguide axis.

11. The waveguide of claim 10, wherein the refractive indices and thicknesses of the alternating dielectric layers are sufficient to produce the photonic bandgap.

12. The waveguide of claim 11, wherein the photonic bandgap is an omnidirectional photonic bandgap.

13. The waveguide of claim 11, wherein the refractive indices and thicknesses of at least some of the alternating dielectric layers substantially satisfy the following equality:

$$\frac{d_{hi}}{d_{lo}} = \frac{\sqrt{n_{lo}^2 - 1}}{\sqrt{n_{hi}^2 - 1}}$$

where $D_{hi}$ and $d_{lo}$ are the thicknesses of adjacent higher-index and lower-index layers, respectively, and $n_{hi}$ and $n_{lo}$ are the refractive indices of the adjacent higher-index and lower-index layers, respectively.

14. The waveguide of claim 11, wherein the confinement region comprises at least 12 pairs of the alternating layers.

15. The waveguide of claim 11, wherein the confinement region comprises a sufficient number of pairs of alternating layers to limit radiative losses of the guided mode to less than 1 dB/m for a frequency in the first range of frequencies.

16. The waveguide of claim 11, wherein the confinement region comprises a sufficient number of pairs of alternating layers to limit radiative losses of the guided mode to less than 0.1 dB/km for a frequency in the first range of frequencies.

17. The waveguide of claim 1, wherein the photonic bandgap is an omnidirectional photonic bandgap.

18. The waveguide of claim 1, wherein the photonic bandgap is sufficient to cause EM radiation that is incident on the confinement region from the core in the first frequency range and with any polarization to have a reflectivity for a planar geometry that is greater than 95% for angles of incidence ranging from 0° to at least 80°.

19. The waveguide of claim 1 wherein the photonic crystal is a two-dimensionally periodic photonic crystal.

20. The waveguide of claim 1 wherein the photonic crystal is a one-dimensionally periodic photonic crystal.

21. The waveguide of claim 1, wherein the first range of frequencies corresponds to wavelengths in the range of about 1.2 microns to 1.7 microns.

22. The waveguide of claim 1, wherein the first range of frequencies corresponds to wavelengths in the range of about 0.7 microns to 0.9 microns.

23. The waveguide of claim 1, wherein the ratio of the bandwidth of the first range of frequencies and a central frequency in the first range of frequencies is at least about 10%.

24. The waveguide of claim 1, wherein the waveguide axis is substantially straight.

25. The waveguide of claim 1, wherein the core has a circular cross-section.

26. The waveguide of claim 1, wherein the core has a hexagonal cross-section.

27. The waveguide of claim 1, wherein the core has a rectangular cross-section.

28. The waveguide of claim 1, wherein the variation in the effective index of the working mode is greater than 10% over the first range of frequencies.

29. The waveguide of claim 1, wherein the variation in the effective index of the working mode is greater than 50% over the first range of frequencies.

30. The waveguide of claim 1, wherein the variation in the effective index of the working mode is greater than 100% over the first range of frequencies.

31. The waveguide of claim 1, wherein the dielectric tailoring region is positioned between the core and the confinement region with respect to the waveguide axis.

32. The waveguide of claim 31, wherein the dispersion tailoring region comprises one or more dielectric layers surrounding the core about the waveguide axis that introduce the one or more additional modes.

33. The waveguide of claim 32, wherein the one or more dielectric layers that introduce the one or more additional modes are adjacent the core.

34. The waveguide of claim 32, wherein the dispersion tailoring region comprises at least one additional dielectric layer positioned between the core and the one or more dielectric layers that introduces the one or more additional modes.

35. The waveguide of claim 32, wherein the one or more dielectric layers that introduce the one or more additional modes are adjacent the confinement region.

36. The waveguide of claim 32, wherein the core defines a light line and wherein the interaction between the guided core mode and the one or more modes introduced by the dispersion tailoring region causes the working mode to cross over the light line for a subset of frequencies in the first range of frequencies.

37. The waveguide of claim 32, wherein the one or more dielectric layers that introduce the one or more additional modes consists of only one dielectric layer.

38. The waveguide of claim 37, wherein the only one dielectric layers has a thickness that supports only one additional mode.

39. The waveguide of claim 37, wherein the only one dielectric layers has a thickness that supports multiple additional modes.

40. The waveguide of claim 31, wherein the confinement region and the dispersion tailoring region comprise alternating layers of two dielectric materials having different refractive indices surrounding the core about the waveguide axis.

41. The waveguide of claim 40, wherein the ratio of the refractive index of the higher index dielectric layer to that of the lower index dielectric layer is greater than 1.1.

42. The waveguide of claim 41, wherein the ratio of the refractive index of the higher index dielectric layer to that of the lower index dielectric layer is greater than 1.5.

43. The waveguide of claim 42, wherein the ratio of the refractive index of the higher index dielectric layer to that of the lower index dielectric layer is greater than 2.

44. The waveguide of claim 40, wherein the thickness of one or more of the layers in the dispersion tailoring region differs from that of a corresponding layer in the confinement region.

45. The waveguide of claim 40, wherein at least one layer in the dispersion tailoring region has a thickness that introduces a defect in the photonic crystal to support the one or more additional modes in the first range of frequencies.

46. The waveguide of claim 1, wherein the one or more modes introduced by the dispersion tailoring region correspond to one or more defect states in the photonic bandgap.

47. The waveguide of claim 1, wherein the dispersion tailoring region forms at least one defect in the photonic crystal to introduce the one or more additional modes into the first range of frequencies.

48. The waveguide of claim 1, wherein the core has a substantially uniform refractive index.

49. The waveguide of claim 1, wherein the tailored dispersion profile comprises a frequency point of zero dispersion in the first range of frequencies.

50. The waveguide of claim 49, wherein the guided mode is a TE mode.

51. The waveguide of claim 49, wherein the first range of frequencies corresponds to wavelengths in the range of about 1.2 microns to 1.7 microns.

52. The waveguide of claim 49, wherein the first range of frequencies corresponds to wavelengths in the range of about 0.7 microns to 0.9 microns.

53. The waveguide of claim 1, wherein the dispersion tailoring region introduces multiple additional modes into the first range of frequency, and wherein the guided mode interacts with the multiple additional modes to produce multiple discontinuous working modes each having a tailored dispersion profile.

54. The waveguide of claim 53, wherein each of the working modes has a point of zero dispersion at a different frequency in the first range of frequency.

55. The waveguide of claim 53, wherein the first range of frequencies corresponds to wavelengths in the range of about 1.2 microns to 1.7 microns.

56. The waveguide of claim 53, wherein the first range of frequencies corresponds to wavelengths in the range of about 0.7 microns to 0.9 microns.

57. The waveguide of claim 1, wherein the tailored dispersion profile includes a first frequency point in the first range of frequencies having a dispersion D with an absolute value greater than 200 ps/(nm–km).

58. The waveguide of claim 57, wherein the tailored dispersion profile includes a first frequency point in the first range of frequencies having a dispersion D with an absolute value greater than 1,000 ps/(nm–km).

59. The waveguide of claim 58, wherein the tailored dispersion profile includes a first frequency point in the first range of frequencies having a dispersion D with an absolute value greater than 10,000 ps/(nm–km).

60. The waveguide of claim 57, wherein the sign of D is negative.

61. The waveguide of claim 57, wherein the sign of D is positive.

62. The waveguide of claim 57, wherein the relative dispersion slope at the first frequency point has an absolute value greater than about 0.02 $nm^{-1}$.

63. The waveguide of claim 62, wherein the relative dispersion slope at the first frequency point has an absolute value greater than about 0.1 $nm^{-1}$.

64. The waveguide of claim 57, wherein the tailored dispersion profile has a figure of merit at the first frequency point greater than about 200 ps/(nm–dB).

65. The waveguide of claim 64, wherein the tailored dispersion profile has a figure of merit at the first frequency point greater than about 500 ps/(nm–dB).

66. The waveguide of claim 57, wherein the first range of frequencies corresponds to wavelengths in the range of about 1.2 microns to 1.7 microns.

67. The waveguide of claim 57, wherein the first range of frequencies corresponds to wavelengths in the range of about 0.7 microns to 0.9 microns.

68. The waveguide of claim 57, wherein the guided mode is a TE mode.

69. The waveguide of claim 57, wherein the guided mode is an $EH_{11}$ mode.

70. The waveguide of claim 57, wherein the guided mode is an $HE_{11}$ mode.

71. The waveguide of claim 1, wherein the confinement region, core, and dispersion tailoring region comprise at least two axial segments having different cross-sectional refractive index profiles.

72. The waveguide of claim 71, wherein the cross-sectional profile of the two segments are substantially identical but for a scaling factor.

73. The waveguide of claim 71, wherein the scaling factor is greater than 1%.

74. The waveguide of claim 1, wherein at least a first end of the waveguide includes a coupling segment over which the refractive index cross-section is continuously varied to alter the field profile of the working mode.

75. The waveguide of claim 1 further comprising a second waveguide coupled to the first mentioned waveguide, wherein the cross-section of the second waveguide adjacent the first waveguide comprises regions of doped silicon located to improve coupling of the working mode into the second waveguide.

76. The waveguide of claim 1 further comprising a second waveguide coupled to the first mentioned waveguide, wherein the cross-section of the second waveguide adjacent the first waveguide comprises a hollow ring contacting the dispersion tailoring region of the first waveguide to thereby improve coupling of the working mode into the second waveguide.

77. An optical telecommunications system comprising:
a transmission waveguide for carrying at least a first optical signal; and
a dispersion compensating waveguide comprising the optical waveguide of claim 1,
wherein the dispersion compensating waveguide is coupled to the transmission waveguide and has a tailored dispersion profile selected to compensate for dispersion imparted to the first optical signal by the transmission waveguide.

78. The system of claim 77, wherein during operation the transmission waveguide carries multiple optical signals each at corresponding frequencies, and wherein the tailored dispersion profile of the dispersion compensating waveguide is selected to compensate for dispersion imparted to each of the optical signals by the transmission waveguide.

79. The system of claim 77, wherein the dispersion compensating fiber is placed within the system where optical power is designed to reach at least 25 dBm.

80. A method for compensating for dispersion in an optical signal, the method comprising:
coupling the optical signal into a photonic crystal fiber having a tailored dispersion profile, wherein the fiber has a core and a dielectric confinement region surrounding the core, the core having an average refractive index smaller than that of the highest index constituent of the dielectric confinement region.

81. The method of claim 80, wherein the confinement region comprises a one-dimensionally periodic photonic crystal.

82. The method of claim 80, wherein the confinement region comprises a two-dimensionally periodic photonic crystal.

83. A method of designing a dispersion compensating fiber having a selected dispersion profile, the method comprising:
introducing a dispersion tailoring region to a waveguide design comprising a dielectric confinement region surrounding a waveguide axis that guides EM radiation in a first range of frequencies to propagate along the waveguide axis and a dielectric core region extending along the waveguide axis and surrounded by the confinement region about the waveguide axis, wherein the dielectric confinement region includes a photonic crystal structure having a photonic bandgap, and wherein the dielectric dispersion tailoring region is surrounded by the confinement region about the waveguide axis; and
selecting the refractive index profile of the dispersion tailoring region to introduce one or more modes in the first range of frequencies that interact with the guided mode to produce a working mode having the selected dispersion profile.

84. An optical waveguide having a working mode with a tailored dispersion profile, the waveguide comprising:
- a dielectric confinement region surrounding a waveguide axis, wherein during operation the confinement region guides EM radiation in a first range of frequencies to propagate along the waveguide axis;
- a dielectric core region extending along the waveguide axis and surrounded by the confinement region about the waveguide axis, wherein the core supports at least one guided mode in the first frequency range, and wherein the core has an average refractive index smaller than that of the dielectric confinement region; and
- a dielectric dispersion tailoring region surrounded by the confinement region about the waveguide axis, wherein the dispersion tailoring region introduces one or more additional modes in the first range of frequencies that interact with the guided mode to produce the working mode.

85. An optical waveguide comprising:
- a dielectric confinement region surrounding a waveguide axis, the confinement region comprising a photonic crystal structure producing at least one photonic bandgap, wherein during operation the confinement region guides EM radiation in a first range of frequencies to propagate along the waveguide axis;
- a dielectric core region extending along the waveguide axis and surrounded by the confinement region about the waveguide axis, wherein the core supports at least one guided mode in the first frequency range; and
- a dielectric dispersion tailoring region surrounded by the confinement region about the waveguide axis, wherein the presence of the dispersion tailoring region causes the guided core mode to form a working mode that penetrates into the dispersion tailoring region for at lease one subset of frequencies within the first range of frequencies.

86. A photonic crystal optical waveguide comprising:
- a dielectric core region extending along a waveguide axis;
- a first set of at least three dielectric layers surrounding the core about the waveguide axis, the difference in refractive index between successive layers in the first set changing sign with each subsequent layer in the first set, and
- at least one additional dielectric layer positioned between the core and the first set of layers, wherein the thickness of the additional dielectric layer differs from that of each of any three consecutive layers in the first set of layers by more than 10%.

87. The waveguide of claim 86, wherein the first set of layers guides EM radiation in a first range of frequencies to propagate along the waveguide axis.

88. The wavelength of claim 86, wherein the thickness of the additional dielectric layer differs from that of each of any three consecutive layers in the first set of layers by more than 30%.

89. The wavelength of claim 86, wherein the thickness of the additional dielectric layer differs from that of each of any three consecutive layers in the first set of layers by more than 150%.

90. A photonic crystal optical waveguide comprising:
- a dielectric core region extending along a waveguide axis;
- a plurality of higher index dielectric layers and a plurality of lower index dielectric layers alternating with one another to surround the core about the waveguide axis; and
- at least one additional dielectric layer positioned between the core and the pluralities of alternating dielectric layers, wherein the thickness of the additional dielectric layer differs from that of each of any three consecutive layers in the pluralities of alternating dielectric layers by more than 10%.

91. The waveguide of claim 90, wherein the pluralities of alternating dielectric layers guide EM radiation in a first range of frequencies to propagate along the waveguide axis.

92. The wavelength of claim 90, wherein the thickness of the additional dielectric layer differs from that of each of any three consecutive layers in the pluralities of alternating dielectric layers by more than 30%.

93. The wavelength of claim 90, wherein the thickness of the additional dielectric layer differs from that of each of any three consecutive layers in the pluralities of alternating dielectric layers by more than 150%.

94. An optical waveguide comprising:
- a dielectric confinement region surrounding a waveguide axis, wherein during operation the confinement region guides EM radiation in a first range of frequencies to propagate along the waveguide axis;
- a dielectric core region extending along the waveguide axis and surrounded by the confinement region about the waveguide axis, wherein the core has an average refractive index smaller than that of the dielectric confinement region, defines a light line, and supports at least one guided mode in the first frequency range; and
- a dielectric dispersion tailoring region surrounded by the confinement region about the waveguide axis, wherein the presence of the dispersion tailoring region introduces causes the guided mode to form a working mode that crosses over the light line.

95. An optical waveguide comprising:
- a dielectric confinement region surrounding a waveguide axis, wherein during operation the confinement region guides EM radiation in a first range of frequencies to propagate along the waveguide axis;
- a dielectric core region extending along the waveguide axis and surrounded by the confinement region about the waveguide axis, wherein the core supports at least one guided mode in the first frequency range; and
- a dielectric dispersion tailoring region surrounded by the confinement region about the waveguide axis, wherein the presence of the dispersion tailoring region causes the guided core mode to form multiple discontinuous working modes each of which penetrates into the dispersion tailoring region for a different subset of frequencies within the first range of frequencies.

* * * * *

UNITED STATES PATENT AND TRADEMARK OFFICE
CERTIFICATE OF CORRECTION

PATENT NO. : 6,895,154 B2
DATED : May 17, 2005
INVENTOR(S) : Steven G. Johnson et al.

It is certified that error appears in the above-identified patent and that said Letters Patent is hereby corrected as shown below:

<u>Title page,</u>
Item [75], Inventors, replace "John D. Joannopolous" with
-- John D. Joannopoulos --.
Item [56], References Cited, OTHER PUBLICATIONS,
"Lars" reference, replace "Grumer-Neilson" with -- Gruner-Neilson --.
"N.J. Doran" reference, replace "Cyclindrical" with -- Cylindrical --.
"Pochi Yeh" reference, replace "Braff" with -- Bragg --.
"T. Iyama" reference, after "of" and before "dielectric" insert -- a --.

<u>Column 23,</u>
Line 7, replace "$D_{hi}$" with -- $d_{hi}$ --.

<u>Column 27,</u>
Line 35, replace "lease" with -- least --.

Signed and Sealed this

Fourteenth Day of February, 2006

JON W. DUDAS
*Director of the United States Patent and Trademark Office*